United States Patent
Isaacson et al.

(10) Patent No.: US 11,380,074 B2
(45) Date of Patent: *Jul. 5, 2022

(54) AUGMENTED REALITY DEVICES FOR HAZARDOUS CONTAMINANT TESTING

(71) Applicant: Becton, Dickinson and Company, Franklin Lakes, NJ (US)

(72) Inventors: Ray Isaacson, Layton, UT (US); Suneil Hosmane, Cambridge, MA (US); Marcel Arantes Souza, Lehi, UT (US); Bart Peterson, Farmington, UT (US); Matthew Oshinski, Oak Ridge, NJ (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/168,605

(22) Filed: Feb. 5, 2021

(65) Prior Publication Data

US 2021/0192850 A1 Jun. 24, 2021

Related U.S. Application Data

(63) Continuation of application No. 16/134,037, filed on Sep. 18, 2018, now Pat. No. 10,916,058.

(60) Provisional application No. 62/561,541, filed on Sep. 21, 2017.

(51) Int. Cl.
*G02B 27/01* (2006.01)
*G06F 3/01* (2006.01)
(Continued)

(52) U.S. Cl.
CPC ........ *G06T 19/006* (2013.01); *G02B 27/0172* (2013.01); *G06F 3/014* (2013.01);
(Continued)

(58) Field of Classification Search
CPC . G06T 2207/30072; G06T 7/11; G06T 7/136; G06T 7/0012; G06T 7/90;
(Continued)

(56) References Cited

U.S. PATENT DOCUMENTS

| | | |
|---|---|---|
| 1,853,238 A | 4/1932 | Shields |
| D229,689 S | 12/1973 | Dragotta |

(Continued)

FOREIGN PATENT DOCUMENTS

| | | |
|---|---|---|
| CN | 107102103 A | 8/2017 |
| WO | WO 1995/25948 | 9/1995 |

(Continued)

OTHER PUBLICATIONS

Becton Dickinson—Veritor™ System—For Rapid Detection of Respiratory Syncytial Virus (RSV), Aug. 2017, Retrieved from the internet: <URL: https://www.bd.com/en-us/offerings/capabilities/microbiology-solutions/point-of-care-testing/veritor-system> in 16 pages.

(Continued)

*Primary Examiner* — Jin Cheng Wang
(74) *Attorney, Agent, or Firm* — Knobbe, Martens, Olson & Bear LLP

(57) ABSTRACT

Aspects of the disclosure relate to augmented reality devices for generating a composite scene including a real-world test environment and an augmented reality overlay visually representing a test area of the environment. Some devices can include wearable displays for displaying an overlay to a user, and other devices can include projectors for illuminating the test environment with the overlay.

20 Claims, 10 Drawing Sheets

(51) Int. Cl.
  *G06K 9/00* (2022.01)
  *G06T 19/00* (2011.01)
  *G06T 7/11* (2017.01)
  *G06T 7/136* (2017.01)
  *G06V 20/20* (2022.01)

(52) U.S. Cl.
  CPC .............. *G06F 3/017* (2013.01); *G06T 7/11* (2017.01); *G06T 7/136* (2017.01); *G06V 20/20* (2022.01); *G02B 2027/0174* (2013.01); *G02B 2027/0178* (2013.01)

(58) Field of Classification Search
  CPC ...... G06T 19/006; G16H 10/40; G16H 20/10; G16H 30/40; G16H 50/20; G01N 33/56983; G01N 21/274; G01N 21/78; A61B 2576/00; A61B 5/1032; A61B 5/6898; A61B 5/742; G06K 9/3216; G06K 9/00671
  See application file for complete search history.

(56) References Cited

U.S. PATENT DOCUMENTS

| | | | |
|---|---|---|---|
| 3,841,973 A | 10/1974 | Wilkins et al. | |
| 4,278,437 A | 7/1981 | Haggar | |
| 4,353,868 A | 10/1982 | Joslin et al. | |
| 4,707,450 A | 11/1987 | Nason | |
| 4,724,307 A | 2/1988 | Dutton et al. | |
| 4,956,302 A | 9/1990 | Gordon et al. | |
| 5,243,865 A | 9/1993 | Hsu et al. | |
| 5,373,748 A | 12/1994 | Lioy et al. | |
| 5,422,273 A | 6/1995 | Garrison et al. | |
| 5,511,654 A | 4/1996 | de la Rocha | |
| 5,511,934 A | 4/1996 | Bracchi et al. | |
| 5,543,115 A | 8/1996 | Karakawa | |
| D383,851 S | 9/1997 | Wong | |
| 5,798,273 A | 8/1998 | Shuler et al. | |
| 5,823,592 A | 10/1998 | Kalidindi et al. | |
| 5,888,758 A | 3/1999 | Wu et al. | |
| D425,625 S | 5/2000 | Niermann | |
| D438,979 S | 2/2001 | Gomes et al. | |
| 6,382,036 B1 | 5/2002 | Woodmansee | |
| 6,924,153 B1 | 8/2005 | Boehringer et al. | |
| D520,643 S | 5/2006 | Clarke et al. | |
| 7,114,403 B2 | 10/2006 | Wu et al. | |
| D558,357 S | 12/2007 | Byrd et al. | |
| D559,397 S | 1/2008 | Eriksson et al. | |
| D560,281 S | 1/2008 | Kozak et al. | |
| D574,507 S | 8/2008 | Muir et al. | |
| D594,131 S | 6/2009 | Nguyen | |
| 7,837,939 B2 | 11/2010 | Tung et al. | |
| D640,795 S | 6/2011 | Jackson et al. | |
| 8,128,871 B2 | 3/2012 | Petruno et al. | |
| 8,486,717 B2 | 7/2013 | O'Farrell et al. | |
| D743,046 S | 11/2015 | Poll et al. | |
| D743,571 S | 11/2015 | Jackson et al. | |
| 9,488,585 B2 | 11/2016 | Emeric et al. | |
| 9,857,372 B1 | 1/2018 | Pulitzer et al. | |
| 9,857,375 B2* | 1/2018 | Konishi | G01N 33/57411 |
| D859,683 S | 9/2019 | Harding et al. | |
| D882,817 S | 4/2020 | Norton et al. | |
| D898,220 S | 10/2020 | Esala et al. | |
| 10,916,058 B2* | 2/2021 | Isaacson | G02B 27/017 |
| 11,002,642 B2 | 5/2021 | Oshinski et al. | |
| D923,195 S | 6/2021 | Harding et al. | |
| 2002/0001539 A1 | 1/2002 | Dicesare et al. | |
| 2002/0035869 A1 | 3/2002 | Schroder et al. | |
| 2003/0086074 A1 | 5/2003 | Braig et al. | |
| 2004/0018634 A1 | 1/2004 | Hajizadeh et al. | |
| 2004/0248106 A1 | 12/2004 | Leonard et al. | |
| 2005/0084842 A1 | 4/2005 | O'Connor | |
| 2005/0106753 A1 | 5/2005 | Wu et al. | |
| 2005/0136540 A1 | 6/2005 | Quine et al. | |
| 2005/0136553 A1 | 6/2005 | Kaylor et al. | |
| 2005/0181517 A1 | 8/2005 | Chandler et al. | |
| 2005/0250141 A1 | 11/2005 | Lambert et al. | |
| 2006/0115805 A1 | 6/2006 | Hansen et al. | |
| 2006/0216196 A1 | 9/2006 | Satoh et al. | |
| 2007/0137319 A1 | 6/2007 | Nacson et al. | |
| 2007/0244368 A1 | 10/2007 | Bayliff et al. | |
| 2007/0276786 A1 | 11/2007 | Piedmonte | |
| 2008/0118397 A1 | 5/2008 | Slowey et al. | |
| 2009/0015273 A1 | 1/2009 | Gossen et al. | |
| 2009/0061534 A1 | 3/2009 | Sharrock | |
| 2009/0223635 A1 | 9/2009 | Lawless | |
| 2010/0077843 A1 | 4/2010 | Doraisamy et al. | |
| 2011/0117025 A1 | 5/2011 | Dacosta et al. | |
| 2011/0201099 A1 | 8/2011 | Anderson et al. | |
| 2012/0011944 A1 | 1/2012 | Maughan et al. | |
| 2012/0044264 A1 | 2/2012 | Lee et al. | |
| 2012/0107956 A1 | 5/2012 | Boehringer et al. | |
| 2012/0264229 A1 | 10/2012 | Wan | |
| 2012/0282154 A1 | 11/2012 | Slowey et al. | |
| 2013/0253295 A1 | 9/2013 | Tolosa et al. | |
| 2013/0280143 A1 | 10/2013 | Zucchelli et al. | |
| 2014/0017812 A1 | 1/2014 | Smith et al. | |
| 2014/0080129 A1 | 3/2014 | Klunder et al. | |
| 2014/0121487 A1 | 5/2014 | Faybishenko et al. | |
| 2014/0176603 A1 | 6/2014 | Kumar et al. | |
| 2014/0183256 A1 | 7/2014 | Calio et al. | |
| 2014/0210857 A1 | 7/2014 | Liu et al. | |
| 2014/0309556 A1 | 10/2014 | Fletcher et al. | |
| 2015/0132795 A1 | 5/2015 | Griswold et al. | |
| 2015/0211987 A1 | 7/2015 | Burg et al. | |
| 2015/0241358 A1 | 8/2015 | Burg et al. | |
| 2015/0302662 A1 | 10/2015 | Miller | |
| 2016/0019716 A1 | 1/2016 | Huang et al. | |
| 2016/0041167 A1 | 2/2016 | Campbell et al. | |
| 2016/0057413 A1 | 2/2016 | Zhou et al. | |
| 2016/0077013 A1 | 3/2016 | Attar et al. | |
| 2016/0078680 A1 | 3/2016 | Reif et al. | |
| 2016/0258874 A1 | 9/2016 | Truex | |
| 2017/0016045 A1 | 1/2017 | McDaniel | |
| 2017/0072393 A1 | 3/2017 | Jackson et al. | |
| 2017/0153185 A1 | 6/2017 | Kisner et al. | |
| 2017/0154438 A1* | 6/2017 | Kisner | G06T 7/90 |
| 2017/0182492 A1* | 6/2017 | Liu | B01L 3/50851 |
| 2018/0247024 A1 | 8/2018 | Divine et al. | |
| 2018/0293350 A1 | 10/2018 | Dimov et al. | |
| 2018/0372595 A1 | 12/2018 | Pais et al. | |
| 2019/0035153 A1 | 1/2019 | Dange | |
| 2019/0086295 A1 | 3/2019 | Oshinski et al. | |
| 2019/0086296 A1 | 3/2019 | West | |
| 2019/0086305 A1 | 3/2019 | Harding et al. | |
| 2019/0086380 A1 | 3/2019 | Harding et al. | |
| 2019/0086431 A1 | 3/2019 | Isaacson et al. | |
| 2019/0120727 A1 | 4/2019 | Harding et al. | |
| 2019/0376966 A1* | 12/2019 | Pulitzer | G01N 21/77 |
| 2020/0241020 A1 | 7/2020 | Oshinski | |
| 2020/0298240 A1 | 9/2020 | Oshinski et al. | |
| 2021/0255066 A1 | 8/2021 | Oshinski et al. | |

FOREIGN PATENT DOCUMENTS

| | | |
|---|---|---|
| WO | WO 2009/018473 | 2/2009 |
| WO | WO 2010/001296 | 1/2010 |
| WO | WO 2011/095599 | 8/2011 |
| WO | WO 2013/036913 | 3/2013 |
| WO | WO 2014/015076 | 1/2014 |
| WO | WO 2014/025415 | 2/2014 |
| WO | WO 2015/187335 | 12/2015 |
| WO | WO 2016/040642 | 3/2016 |
| WO | WO 2016/078919 | 5/2016 |
| WO | WO 2016/090176 | 6/2016 |

OTHER PUBLICATIONS

Becton Dickinson—BD Diagnostics Preanalytical Systems—Product Catalogue 2014-15; 2013, Retrieved from internet: <URL:https://www.bd.com/be/dutch/pdfs/PAS_BNL_Prod_Cat_2014_2015_LR_Full_Catalogue.pdf> in 31 pages.

(56) References Cited

OTHER PUBLICATIONS

Becton Dickinson—BD HD Check Analyzer—Nursing Brochure; Mar. 2018, in 8 pages.
Becton Dickinson—BD HD Check Analyzer—Pharmacy Brochure; Mar. 2018, in 6 pages.
Chemoglo, LLC, "ChemoGlo™—Detecting and Removing Hazardous Drugs"; available for download at https://web.archive.org/web/20150801115335/http://chemoglo.com/ at least as early as Aug. 1, 2015; 1 page.
Chemoglo, LLC, ChemoGlo™ User Manual; available for download at https://web.archive.org/web/20150801115335/http://chemoglo.com/ at least as early as Aug. 1, 2015; 11 pages.
Preprocess, Inc., Sampling and Analytical Technique Considerations for Microbial Surface Swab Testing. 2015; Retrieved from the internet: <URL:http://www.preprocessinc.com/files/documents/d5840edf837f077be7b12e53494ed5b8.pdf> in 3 pages.
Technical Service Consultants Ltd., TS/15-T Product Specification Sheet; Issue #5 of Jun. 6, 2016; Retrieved from the Internet: URL:<http://www.tscswabs.co.uk/uploads/images/product-pdfs/product_specification/spec_TS15-T.pdf> in 20 pages.
International Search Report and Written Opinion dated Nov. 28, 2018 for corresponding PCT/US2018/051441.
De Keuckelaere et al., "Semi-Direct Lysis of Swabs and Evaluation of Their Efficiencies to Recover Human Noroviruses GI and GII from Surfaces", Food Environ Virol. (Jun. 2014) 6: 132-139.
Henderson S.J., "Augmented Reality Interfaces for Procedural Tasks", Doctoral Thesis; Columbia University, Apr. 14, 2011, 82 pages.
National Infection Service (England), Detection and enumeration of bacteria in swabs and other environmental samples. National Infection Service Food Water and Environmental Microbiology Standard Method, Sep. 1, 2017; 22 pages.

\* cited by examiner

AUGMENTED REALITY DEVICES FOR HAZARDOUS CONTAMINANT TESTING

CROSS-REFERENCE TO RELATED APPLICATIONS

This application is a continuation of U.S. patent application Ser. No. 16/134,037, filed Sep. 18, 2018 and scheduled to issue as U.S. Pat. No. 10,916,058 on Feb. 9, 2021, which claims the benefit of U.S. Provisional Patent Application No. 62/561,541, filed on Sep. 21, 2017, entitled "AUGMENTED REALITY DEVICES FOR HAZARDOUS CONTAMINANT TESTING," the contents of which are hereby incorporated by reference herein.

TECHNICAL FIELD

Systems and methods disclosed herein are directed to environmental contaminant testing, and, more particularly, to devices for accurately measuring features of a sampled area, including physical dimensions of the sampled area.

BACKGROUND

Antineoplastic drugs are used to treat cancer, and are most often found in a small molecule (like fluoruracil) or antibody format (like Rituximab). Detection of antineoplastic drugs is critical for determining if there is contamination or leakage where the drugs are used and/or dispensed, such as hospital and pharmacy areas.

The nature of antineoplastic drugs make them harmful to healthy cells and tissues as well as the cancerous cells. Precautions should be taken to eliminate or reduce occupational exposure to antineoplastic drugs for healthcare workers. Pharmacists who prepare these drugs and nurses who may prepare and administer them are the two occupational groups who have the highest potential exposure to antineoplastic agents. Additionally, physicians and operating room personnel may also be exposed through the treatment of patients, as patients treated with antineoplastic drugs can excrete these drugs. Hospital staff, such as shipping and receiving personnel, custodial workers, laundry workers and waste handlers, all have the potential to be exposed to these drugs during the course of their work. The increased use of antineoplastic agents in veterinary oncology also puts these workers at risk for exposure to these drugs.

SUMMARY

Antineoplastic drugs are antiproliferative. In some cases they affect the process of cell division by damaging DNA and initiating apoptosis, a form of programmed cell death. While this can be desirable for preventing development and spread of neoplastic (e.g., cancerous) cells, antineoplastic drugs can also affect rapidly dividing non-cancerous cells. As such, antineoplastic drugs can suppress healthy biological functions including bone marrow growth, healing, hair growth, and fertility, to name a few examples.

Studies have associated workplace exposures to antineoplastic drugs with health effects such as skin rashes, hair loss, infertility (temporary and permanent), effects on reproduction and the developing fetus in pregnant women, increased genotoxic effects (e.g., destructive effects on genetic material that can cause mutations), hearing impairment and cancer. These health risks are influenced by the extent of the exposure and the potency and toxicity of the hazardous drug. Although the potential therapeutic benefits of hazardous drugs may outweigh the risks of such side effects for ill patients, exposed health care workers risk these same side effects with no therapeutic benefit. Further, it is known that exposures to even very small concentrations of antineoplastic drugs may be hazardous for workers who handle them or work near them, and for known carcinogenic agents there is no safe level of exposure.

Environmental sampling can be used to determine the level of workplace contamination by antineoplastic agents. Sampling and decontamination of contaminated areas is complicated, however, by a lack of quick, inexpensive methods to first identify these areas and then determine the level of success of the decontamination. Although analytical methods are available for testing for the presence of antineoplastic drugs in environmental samples, these methods require shipment to outside labs, delaying the receipt of sampling results.

In one example sampling system suitable for use with the devices of the present disclosure, work surfaces can be tested for the presence of antineoplastic agents in an environment. Results of the test can be provided very quickly, at the site of testing, so that the operator of the test, other personnel in the area, and/or remote systems can be alerted to the presence and/or concentration of antineoplastic agents very close in time to the test event, in some cases within 1-2 minutes. Methods of testing include providing the surface with a buffer solution and wiping the wetted surface with an absorbent swab, or by wiping the surface with a swab pre-wetted with the buffer solution. The buffer fluid can have properties that assist in picking up contaminants from the surface. In some implementations, the buffer fluid can have properties that assist in releasing collected contaminants from swab material. The collected contaminants can be mixed into a homogeneous solution for testing. The buffer solution, together with any collected contaminants, can be expressed or extracted from the swab to form a liquid sample. This liquid sample can be analyzed for presence and/or quantity of specific antineoplastic agents. For example, the solution can be provided onto an assay (such as but not limited to a lateral flow assay) which is read by an assay reader device to identify presence and/or a concentration of the contaminant in the liquid sample. The reader device can alternatively identify the concentration of the contaminant on the test area, for example delivering a result of concentration per area (e.g., $ng/ft^2$).

The accuracy of testing for the presence and/or concentration of a contaminant in a fluid sample is highly dependent on various test factors. Test results can provide a measurement in the form of concentration of contaminant in a tested environment, for example contaminant mass per square unit area. Accordingly, precision and accuracy in measuring the sampled area can be an important factor to obtain an accurate test result. Accurately measuring a specific sample area can involve demarcating a test area of the surface to be tested and then sampling the entire demarked area. Existing sampling systems require the test operator to measure out test area dimensions and place physical markers, such as adhesive dots, to define a rectangular test area. The test operator of such existing systems is then responsible for ensuring that the entire area is swabbed before cleaning up the markers. This approach has a number of drawbacks including requiring a lengthy setup, being subject to measurement and marker placement errors, lacking any tracking of actual sampled area, and increasing the risk of exposure of the test operator to potential hazardous drug contamination through placement and removal of the markers. For example, it increases the amount of time required to test an area to require the user to grab a measuring tape, lay it down to measure the surface, and mark the area by peeling off and placing round stickers. This can be cumbersome across a variety of test surfaces including counter tops, floors, walls, and others. Not being able to accurate and consistent in selecting and marking an area from which the user captures a sample causes the resulting test results to be inaccurate.

These and other problems are addressed in embodiments of the hazardous drug collection and detection systems described herein, which include augmented reality devices configured to demarcate a test area and then track the portions of that area that are sampled by the test operator. With the disclosed systems, a user does not even have to demarcate an area because this is done automatically by an augmented reality device, and the device can track the amount of area actually sampled both within and outside of the pre-defined demarcated test area. Thus, the augmented reality systems described herein both increase test result accuracy and decrease time required for testing as well as mitigate exposure opportunities where the user may contact a contaminated surface. The present technology provides improved accuracy for identifying antineoplastic drug concentrations, including trace amounts of antineoplastic drugs, compared to existing systems. The disclosed augmented reality devices can communicate information relating to a tested area to a detection system that analyzes the sample acquired from the tested area. The detection system is capable of accurately detecting quantities of even trace amounts of antineoplastic agents and of providing results quickly (including immediately after collection). Advantageously, testing and detection can occur at the location of the collection so that immediate, quantitative assessment of contamination level can be determined without the delay required for laboratory sample processing.

Accordingly, one aspect relates to an augmented reality system for guiding collection of hazardous contaminant samples, comprising an image capture device configured for capturing images of a sampling environment including a test surface; a display configured to display an augmented reality overlay over a view of the sampling environment, the augmented reality overlay including a visual representation of a boundary of a test area of the test surface; at least one computer-readable memory having stored thereon executable instructions; and one or more processors in communication with the at least one computer-readable memory and configured to execute the instructions to cause the system to determine a size of the test area, determine a location of the test area relative to one or both of the system and the sampling environment, cause output via the display of the visual representation of the boundary of the test area, monitor interactions between a user and the test area as the user swabs the test area to collect a sample, determine an actual area swabbed by the user based on the monitored interactions, the size of the test area, and the location of the test area, and transmit an indication of the actual area swabbed.

In some embodiments of the system, the one or more processors are configured to execute the instructions to cause the system to analyze data from the image capture device to monitor the interactions between the user and the test area. In some embodiments of the system, the one or more processors are configured to execute the instructions to cause the system to transmit the indication of the actual area swabbed to a test device identified for analysis of the sample. In some embodiments of the system, the one or more processors are configured to execute the instructions to cause the system to receive an indication of a level of contamination of the test surface and output an alert to the user indicating the presence of contamination. In some embodiments of the system, the one or more processors are configured to execute the instructions to cause the system to receive an indication of a level of contamination of the test surface and output an alert to the user indicating the level of contamination.

In some embodiments of the system, the one or more processors are configured to execute the instructions to cause the system to modify presentation of the test area in the augmented reality overlay to show swabbed areas of the test area using a first visual depiction and to show unswabbed areas of the test area using a second visual depiction. In some further embodiments, the first visual depiction is different than the second visual depiction. In some further embodiments, the one or more processors are configured to execute the instructions to cause the system to identify the swabbed areas based on the monitored interactions between the user and the test area. In some further embodiments, the one or more processors are configured to execute the instructions to cause the system to display a trail over the swabbed areas.

In some embodiments of the system, the one or more processors are configured to execute the instructions to cause the system to maintain, in the augmented reality overlay, the location of the test area relative to one or both of the system and the sampling environment as the user moves around the sampling environment. In some embodiments of the system, one or more processors are configured to execute the instructions to cause the system to compare the actual area swabbed by the user to a predetermined threshold swabbed area, and in response to determining that the actual area swabbed is equal to the predetermined desired swabbed area, provide an indication to the user to terminate swabbing the test area. In some embodiments of the system, the sample is a liquid sample. In some embodiments of the system, the one or more processors are configured to execute the instructions to cause the system to receive data from the image capture device representing a test device after provision of the sample to the test device, and analyze the received data to identify the presence of a hazardous contaminant and/or a level of contamination of a hazardous contaminant on the test surface.

Another aspect relates to an augmented reality apparatus for guiding collection of hazardous contaminant samples, comprising an image capture device configured for capturing images of a test surface; a projector configured to project an augmented reality overlay onto the test surface, the augmented reality overlay including a visual representation of a boundary of a test area of the test surface; at least one computer-readable memory having stored thereon executable instructions; and one or more processors in communication with the at least one computer-readable memory and configured to execute the instructions to cause the system to cause output via the display of the visual representation of the boundary of the test area, analyze data received from the image capture device to monitor interactions between a user and the test area as the user swabs the test area to collect a sample, determine an actual area swabbed by the user based on the monitored interactions, and transmit an indication of the actual area swabbed.

In some embodiments of the apparatus, the sample is a liquid sample. In some embodiments of the apparatus, the one or more processors are configured to execute the instructions to cause the system to receive an indication of a level of contamination of the test surface and output an alert to the user indicating the level of contamination. In some embodiments of the apparatus, the one or more processors are configured to execute the instructions to cause the system to receive an indication of a level of contamination of the test surface and output an alert to the user indicating the presence of contamination. In some embodiments of the apparatus, the one or more processors are configured to execute the instructions to cause the system to transmit the indication of the actual area swabbed to a test device identified for analysis of the sample.

In some embodiments of the apparatus, the one or more processors are configured to execute the instructions to cause the system to modify presentation of the test area in the augmented reality overlay to indicate swabbed areas of the test area. In some further embodiments, the one or more processors are configured to execute the instructions to cause the system to identify the swabbed areas based on the monitored interactions between the user and the test area. In some further embodiments, the one or more processors are configured to execute the instructions to cause the system to modify presentation of the test area in the augmented reality overlay to show swabbed areas of the test area using a first visual depiction and to show unswabbed areas of the test area using a second visual depiction. In some further embodiments, the one or more processors are configured to execute the instructions to cause the system to stop projection of a pattern onto the swabbed areas and maintain projection of the pattern onto the unswabbed areas.

In some embodiments of the apparatus, the one or more processors are configured to execute the instructions to cause the system to compare the actual area swabbed by the user to a predetermined swabbed area, and in response to determining that the actual area swabbed is equal to the predetermined swabbed area, provide an indication to the user to terminate swabbing the test area.

Another aspect relates to a non-transitory computer-readable medium storing instructions that, when executed, cause a physical computing device to perform operations for guiding collection of a sample of a hazardous contaminant, the operations comprising causing output of a visual representation of a boundary of a test area for guiding a user to collect the sample of the hazardous contaminant from the test area; monitoring interactions between the user and the test area as the user swabs the test area to collect the sample; determining an actual area swabbed by the user based on the monitored interactions; identifying a test device designated for analysis of the sample; and transmitting, to the test device, an indication of the actual area swabbed.

In some embodiments, the operations further comprise modifying presentation of the test area to indicate swabbed and unswabbed areas of the test area. In some embodiments, the operations further comprise identifying the swabbed and unswabbed areas of the test area based on monitoring the interactions. In some embodiments, causing output of the visual representation of the boundary of the test area comprises overlaying the visual representation over a view the test area through a transparent near eye display. In some embodiments, causing output of the visual representation of the boundary of the test area comprises overlaying the visual representation over an image of the test area to form a composite view, and displaying the composite view to the user. In some embodiments, causing output of the visual representation of the boundary of the test area comprises projecting the visual representation onto the test area.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1A:
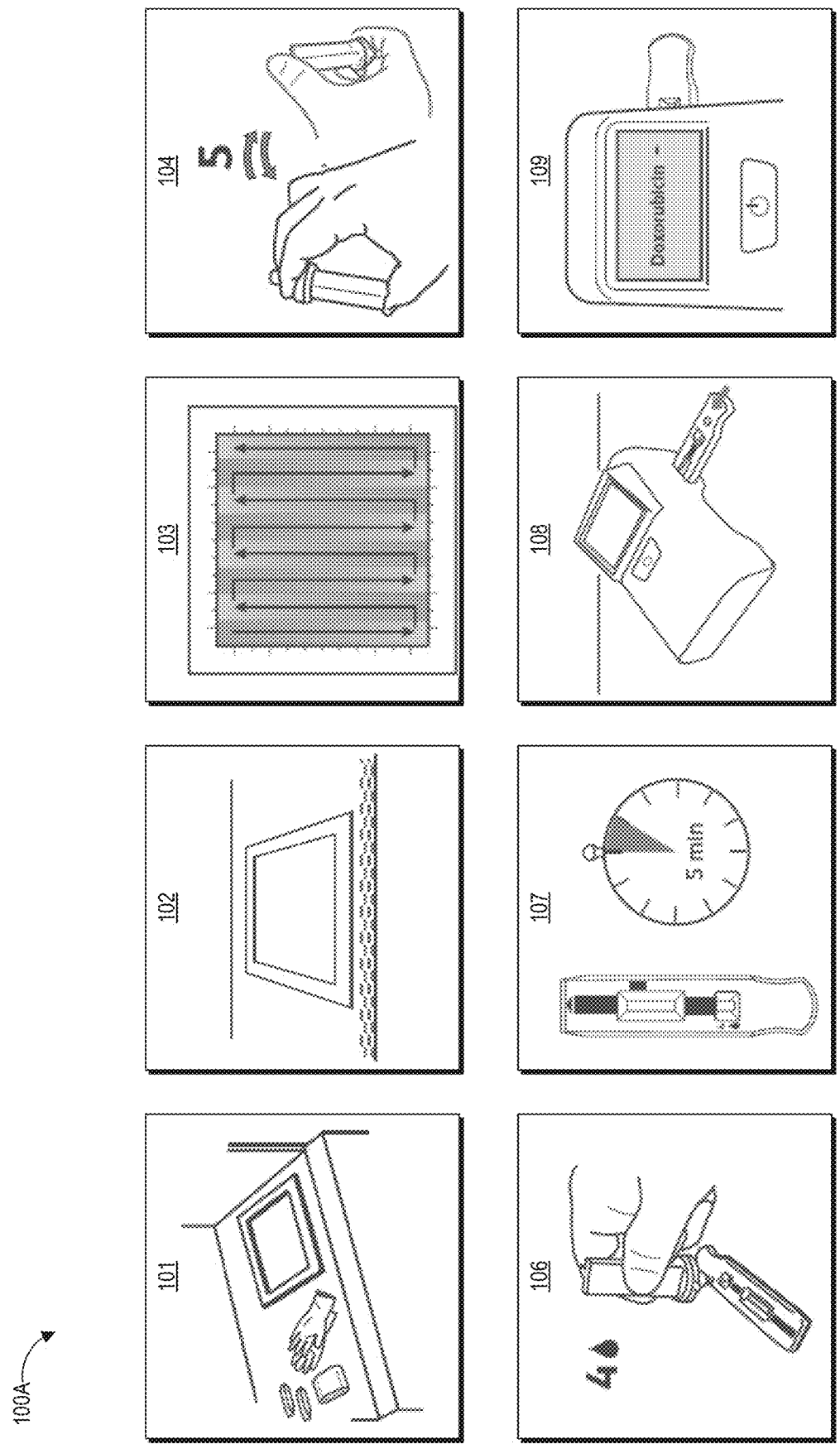
FIGS. 1A-1D graphically illustrate steps of an example method of collecting and testing a liquid sample as described herein.

Embodiments of the disclosure relate to systems and techniques for detection of hazardous environmental contaminants, such as but not limited to antineoplastic drugs used in the treatment of cancer, with increased sensitivity to trace concentrations of antineoplastic drugs in collected samples. A kit for such testing can include a collection system and a testing device, and the collection system can include an augmented reality device for demarcating the test area and tracking how much of the demarcated area is sampled. Throughout this disclosure, example systems, kits, and methods will be described with reference to collection, testing, and detection of antineoplastic agents, but it will be understood that the present technology can be used to collect, test, and detect any particle, molecule, or analyte of interest.

A precise method of demarcating and sampling from a specified area can be important in order to obtain an accurate test result in the form of drug mass per square unit area (e.g., nanograms per square centimeter). For example, a sample can be collected from a test surface by using a buffer liquid to wet the surface and using a swab to absorb the buffer liquid and any particles of hazardous drug contamination. When the sample is tested, a test device may be able to identify the concentration of the hazardous drug in the volume of the liquid sample. In order to convert this measurement into a measurement of drug concentration on the test surface, some implementations can use the following formula:

$$\alpha = (C v_b)/(A \eta_p \eta_c)$$

where $\alpha$ represents the contamination surface density (e.g., ng/cm$^2$), C represents the concentration of the sample in the liquid sample, $v_b$ represents the fluid volume of the buffer solution used to collect the sample, A represents the surface area swabbed, $\eta_p$ represents the pick up efficiency of the swab material and buffer solution, and $\eta_c$ represents the extraction efficiency of contaminant picked up by the swab material. The goal is to have a high concentration signal with low variability, however noise (e.g., variation) in these variables can cause the test to generate either false positive or false negative results. The disclosed augmented reality systems provide guidance for reducing the variation in the surface area swabbed, leading to heightened accuracy in sample testing, and in particular to a more accurate contamination surface density measurement.

Embodiments of the systems and methods described herein can advantageously determine two important aspects regarding contamination of a tested surface quickly and with high precision. First, the disclosed systems and methods can determine the presence of even a very small amount of a hazardous contaminant. This provides an important benefit over manual sampling (e.g., sampling performed without the disclosed augmented reality overlays and area tracking), because if there are just a few molecules on the surface, the user may miss the molecules entirely if they do not sample the test area in a regular, constrained, precise way. This type of sampling can lead to a false negative, leading to a missed opportunity to fix a leak or breach of protocol. In one example, the false negative reading may lead to healthcare workers continuing work in the tested area, resulting in their exposure to the hazardous contaminant. The disclosed augmented reality devices ensure the user is reliably informed of the presence of even small amounts of hazardous agent, for example by guiding the user to perform a thorough sampling and by tracking actual sampled area. Second, the disclosed systems and methods can be used to more precisely determine the concentration of a detected hazardous contaminant by providing an accurate metric regarding actual sampled area. This is important because the presence of a very small or trace concentrations of certain hazardous drugs may be tolerable or even expected within an environment in some scenarios, but the difference between a smaller, acceptable trace concentration and a larger, unacceptable and potentially dangerous trace concentration may be very small (e.g., on the order of nanograms per centimeter). The disclosed augmented reality devices enable the user to now know very quickly and reliably if the concentration of a hazardous contaminant has elevated to dangerous conditions. Further, advantages of the systems and methods disclosed herein are not limited to guiding a user that is swabbing a test surface in order to heighten accuracy of the test result. The augmented reality devices advantageously minimize the spread of contamination by providing the user with test area demarcation without requiring the user to contact the test surface, and by guiding the user to collect a sample in a defined, highly constrained process. The sample collection guidance can minimize the spread of existing contamination by helping to reduce unintended spillage and uncontrolled spread of buffer solution, unintended spreading of antineoplastic agent to other surfaces that are not contaminated, and unintended spreading of antineoplastic agent to the user.

As used herein, "augmented reality" refers to a live direct view or indirect view of a physical, real-world environment having elements augmented by a computer-generated visual overlay, for example images, projected shapes or patterns, user-interface elements, and the like. A live direct view refers to the user looking directly at the environment, for example through a transparent display screen or at an environment overlaid with a projection, while an indirect view refers to the user viewing an image of the environment. Certain elements in an augmented reality environment may be interactive and digitally manipulable through user input or feedback to the augmented reality device, for example through automated gesture recognition, spoken commands, and/or user interaction with physical controls (e.g., buttons, joysticks, touch-sensitive panels, etc.) of the device.

An augmented reality overlay as described herein can be presented in real time. As used herein, "real time" describes computing systems that augment real-world processes at a rate that substantially matches that of the real process. In order to substantially match the rates, the disclosed real time systems provide responses within specific time constraints, often in the order of milliseconds or microseconds. As such, the disclosed real time augmented reality systems can augment the environment of the user (or an image of the environment) with an augmented reality overlay suitable for that environment as the user is still experiencing that environment. From the perspective of the user, a real time system may present no perceptible lag in updating the augmented reality overlay when changes occur in the real environment.

Although described primarily within the context of an augmented reality, it will be appreciated that the disclosed area demarcation and tracking techniques can also be implemented in a virtual reality environment for testing contamination of hazardous drugs, where the virtual reality environment permits user interaction with the real-world testing environment.

Drugs successfully treat many types of illnesses and injuries, but virtually all drugs have side effects associated with their use. Not all adverse side effects classify as hazardous, however. In the present disclosure, the term "hazardous drugs" is used according to the meaning adopted by the American Society of Health-System Pharmacists (ASHP), which refers to a drug as hazardous if studies in animals or humans have indicated that exposures to them have any one of four characteristics: genotoxicity; carcinogenicity; teratogenicity or fertility impairment; and serious organ damage or other toxic manifestation at low doses in experimental animals or treated patients.

Although described in the example context of ascertaining the concentration of hazardous drugs such as antineoplastic agents, it will be appreciated that the disclosed devices and techniques for demarcating and tracking a test sampling area can be used to detect the presence and/or concentration of any analyte of interest. An analyte can include, for example, drugs (both hazardous and non-hazardous), antibodies, proteins, haptens, nucleic acids and amplicons.

Various embodiments will be described below in conjunction with the drawings for purposes of illustration. It should be appreciated that many other implementations of the disclosed concepts are possible, and various advantages can be achieved with the disclosed implementations.

Overview of Example Sampling Method

FIGS. 1A-1D graphically illustrate steps of an example method of collecting and testing a liquid sample as described herein. FIG. 1A illustrates example steps of a testing method 100A for testing for the presence of an analyte on a test surface. One, some, or all of the depicted blocks of FIG. 1A can be printed as graphical user interface instructions on the packaging of an assay and/or collection kit, or can be presented on a display screen of an assay reader device, a test area terminal, or a personal computing device of the user.

At block 101, the user can identify a sample location and gather a collection kit, assay cartridges, and a template. The collection kit can include a swab attached to a handle and a collection container. In some examples, the swab is pre-wetted with buffer solution and packaged together with the handle in a first sealed pouch and the collection container is packaged in a second sealed pouch. The assay cartridge may include an assay device housed inside a cartridge having a window or port aligned with a sample receiving zone of the assay device. In one implementation, the assay device is a test strip, for example but not limited to a lateral flow assay test strip. Also at block 101 the user can put on clean gloves prior to each sample collection and/or opening of the collection kit, both to protect the user from potential contamination on the surface and to protect the collected sample from contamination on the user's hands.

At block 102, the user can establish a test area on the test surface. For example, the user can place a template (physical or projected) over the intended location to clearly demarcate the area that will be swabbed. As described herein, block 102 can involve a user putting on and/or activating an augmented reality device to demarcate the test area. Also at block 102 the user can open the collection kit packaging, including opening the separately-packaged swab and handle.

At block 103, the user can swab the entire test area with the pre-moistened swab. The user can swab the test area using slow and firm strokes. As shown, the user can methodically pass the swab in straight lines along the height of the test area all the way across the width of the test area. The test area may be one square foot in some embodiments, for example demarcated as a 12 inches by 12 inches (144 square inches) region. Other examples can use greater or smaller areas for collection including 10 inches by 10 inches, 8 inches by 8 inches, 6 inches by 6 inches and 4 inches by 4 inches, non-square rectangular regions (e.g., a 9 inches by 16 inches rectangle), and non-rectangular regions (e.g. circles). As described herein, the test area can be demarcated via an augmented reality user interface, and the actual area sampled can be tracked and automatically calculated by a device having a camera positioned to observe the test area. The demarcation, tracking, and area calculation can be performed by an augmented reality device as described herein. The area that a user is instructed by the device to sample during a given test can be determined dynamically by the device, for example based on the nature of the surface. For example, swabbing a countertop may use a default swab area of a 12 inches by 12 inches region, while the device may determine to use a smaller region for swabbing an IV pole, with this determination and the size of the smaller region being based on determination of the size of the IV pole in images captured by the device.

At block 104, the user can insert the swab into the collection container. In some examples, the collection container includes a t-shaped well. Though not illustrated, the swab may have a t-shaped cross-section that substantially matches that of the container well. The user seals the container with a top that includes a dripper cap, and fully inverts (e.g., turn upside down and then return to right-side-up) the sealed container five times. During these inversions, the liquid in the reservoir of the container washes primarily over the swab material due to the cross-sectional shape and other features of the reservoir, and the handle slides within the reservoir due to the reservoir having a greater height than the handle. As described herein, the inversion combined with the geometries of the container and handle and the flow of the buffer solution can extract collected contaminants from the swab material. In one non-limiting example, the user does not invert or agitate the container before moving to the next step.

At block 106, the user can leave the swab and handle inside the container, remove the dripper cap, and squeeze (or allow gravity to draw) one or more drops (for example but not limited to four drops) into the sample well on one or more assay cartridges. For example, in some embodiments the user may drop sample onto multiple assays each designed to test for a different drug. In some examples anywhere between three and ten drops can produce suitable results on the assay. A drop is an approximated unit of measure of volume corresponding to the amount of liquid dispensed as one drop from a dropper or drip chamber via gravitational pull (sometimes aided by a positive pressure created within the container holding the liquid). Though the precise volume of any given drop depends upon factors such as the surface tension of the liquid of the drop, the strength of the gravitational field pulling on the drop, and the device and technique used to produce the drop, it is commonly considered to be a volume of 0.05 mL. In alternate embodiments the user may mechanically couple a fluid transfer portion of the collection device to a fluid transfer portion of the assay device to release a controlled volume of sample through a closed fluid pathway.

At block 107, the user can use a timer to allow the sample to develop for a period of time. For example, the sample can develop for about one minute, about two minutes, about three minutes, about four minutes, about five minutes, about six minutes, or some other amount of time. Other development times are possible. In some embodiments the timer can be built in to the programming of the reader device that reads the assay. The development time can vary depending on the particular test that is being performed and the particular operating parameters of the assay device.

At block 108, the user can insert the assay cartridge into an assay reader device. The assay cartridge can be inserted into the ready device prior to or after the sample is developed, depending upon the operational mode of the device. In some embodiments, the user may sequentially insert multiple cartridges for testing different aspects of the sample or for ensuring repeatability of test results.

At block 109, the assay reader device reads portions of the inserted cartridge (including, for example, detecting optical signals from exposed areas of a capture zone of a test strip housed in the cartridge), analyzes the signals to determine optical changes to test zone location(s) and optionally control zone location(s), determines a result based on the optical changes, and displays the result to the user. The device can optionally store the result or transmit the result over a network to a centralized data repository. As illustrated, the device displays a negative result for the presence of Doxorubicin in the sample. In other embodiments the device can display a specific detected concentration level in the sample and/or determined for the test area, and optionally can display confidence values in the determined result.

Embodiments of the reader devices described herein can determine the presence or the absence of a hazardous drug on a tested surface with a high degree of confidence, and display an indication of this test result to a user very quickly (in some instances, within 1 to 2 minutes) after the user tests the surface. In some cases, the reader device can determine a concentration of contamination and display an indication of the determined concentration to the user very quickly (in some instances, within 1 to 2 minutes) after the user tests the surface. In still further examples, the reader device correlates a detected level of contamination with a risk of human uptake and/or risk of harmful exposure to humans. To illustrate in one non-limiting example, an unintended human uptake of 1.0 $ng/cm^2$ of Cyclophosphamide, a hazardous antineoplastic drug, can be deemed a harmful exposure and/or exposure to a carcinogen. It will be understood that a different level of contamination of Cyclophosphamide could be established as a threshold for harmful exposure, and that the level of contamination for various antineoplastic drugs can be set to different levels depending on the needs of the user and the testing environment.

In this example, the reader device is configured to detect a level of contamination of Cyclophosphamide for a 12 inch by 12 inch (just as an example) sampled area that is $1/10^{th}$ of this 1.0 ng/cm$^2$ threshold level of Cyclophosphamide contamination, or 0.1 ng/cm$^2$. For example, the dynamic range of the assay test device (and reader devices described herein that read the disclosed assay devices) can be capable of detecting a level of contamination of Cyclophosphamide as low as about 0.1 ng/cm$^2$ per 12 inch by 12 inch sample test area. In one non-limiting embodiment, the reader device is configured to display an indication of an actual measured concentration of Cyclophosphamide. For example, a display on the reader device may display the reading "0.085 ng/cm$^2$" to the user upon completion of reading the test device. In another non-limiting embodiment, the reader device is configured to indicate a binary result to the user based on an actual measured concentration of Cyclophosphamide. For example, a display on the reader device may display the reading "−" or "−Cyclophosphamide" to the user upon completion of reading the test device when the actual measured concentration of Cyclophosphamide is less than about 0.1 ng/cm$^2$ (equivalent to a 93 ng mass of Cyclophosphamide for a 12 inch by 12 inch test sample area). The display on the reader device may display the reading "+" or "+ Cyclophosphamide" to the user upon completion of reading the test device when the actual measured concentration of Cyclophosphamide is about 0.1 ng/cm$^2$ or greater (equivalent to a 93 ng mass of Cyclophosphamide for a 12 inch by 12 inch test sample area).

In some examples, the reader device is configured to correlate an actual measurement of contamination with a risk of human uptake and/or risk of harmful exposure to humans and to display an indication of the risk to the user upon completion of reading the test device. For instance, the reader device may be configured to correlate an actual measured concentration of Cyclophosphamide of less than about 0.1 ng/cm$^2$ as a reading within a window of acceptable error and/or with a low risk of harmful exposure. In this case, the reader device can display a reading of "No further action" to the user. The reader device can be configured to correlate an actual measured concentration of Cyclophosphamide of about 0.1 ng/cm$^2$ (equivalent to a 93 ng mass of Cyclophosphamide for a 12 inch by 12 inch test sample area) with a moderate risk of harmful exposure. In this case, the reader device can display a reading of "Notify others; Begin Decontamination" to the user. The reader device can be configured to correlate an actual measured concentration of Cyclophosphamide of greater than about 0.1 ng/cm$^2$ (equivalent to a 93 ng mass of Cyclophosphamide for a 12 inch by 12 inch test sample area) as a reading within a window of unacceptably high contamination. In this case, the reader device can display a reading of "Evacuate immediately" to the user. The reader device may also automatically transmit a warning or alert to the user with a warning sound or light (for example, a voice prompt or bright flashing light); transmit a warning or alert to other personnel within a distance of the reader device and the tested surface (for example, initiate voice prompts to evacuate the immediate area, emit a high-decibel siren, etc.); and/or transmit a warning or alert to personnel within or outside the physical location where the test event occurred (transmit, via a wired or wireless connection, an emergency notification to a head pharmacist, nurse, manager, safety officer, or regulatory agency that includes location of the test event, hazardous drug name, and the measured concentration of the hazardous drug). These examples are not intended to be limiting and it will be understood that other concentrations, thresholds, display readings, and warnings can be implemented in the systems described herein.

After testing the user can re-seal the container with the dripper cap and dispose of the collection device and assay (for example in compliance with hazardous waste regulations). Optionally, the user can execute any needed decontamination procedures, re-test a decontaminated surface, and perform required reporting of the result.

Figure 1B:
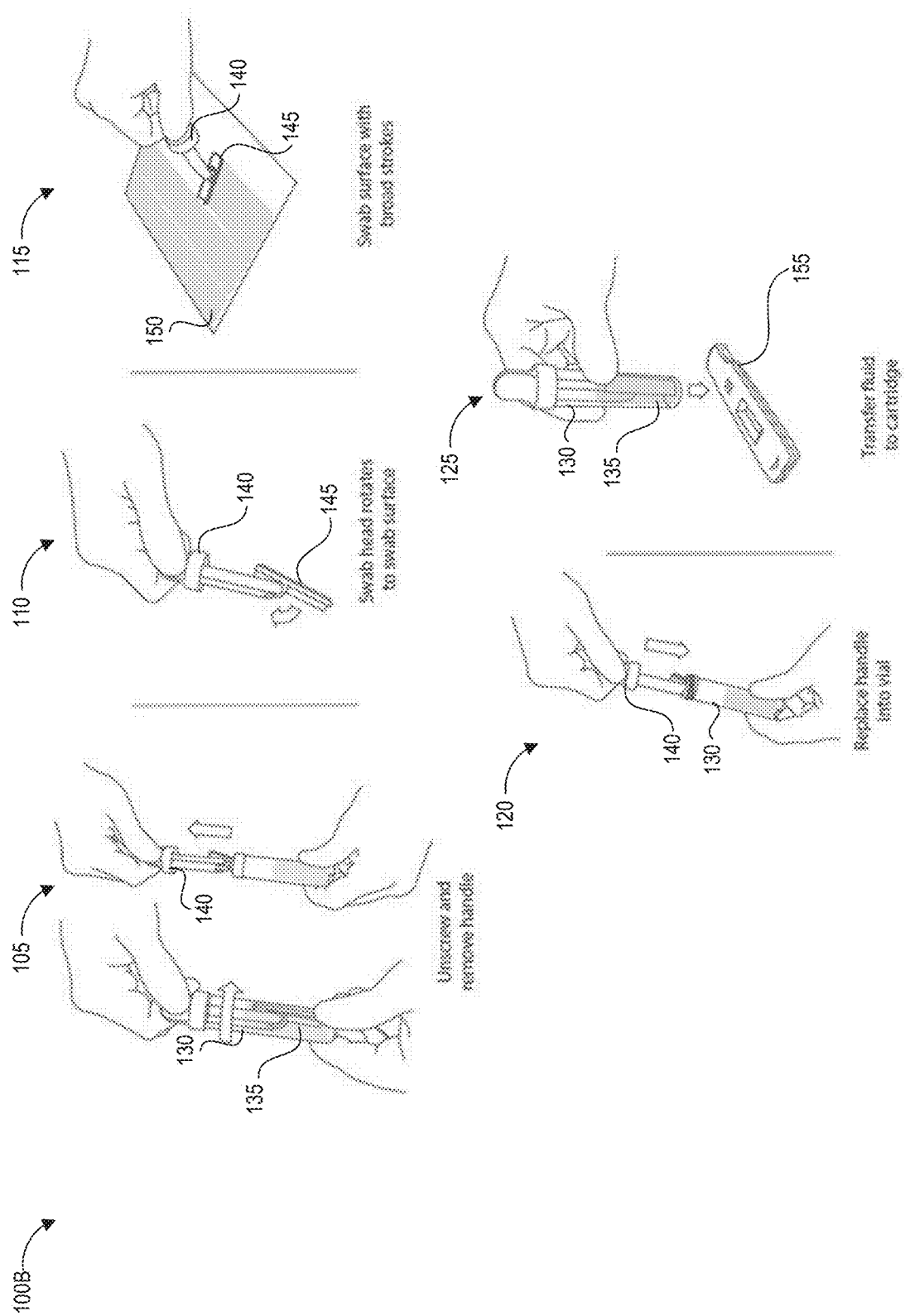

FIG. 1B illustrates another testing method 100 that depicts details of steps 103, 104, and 106 of the process 100A using an alternate embodiment of the collection device.

The method 100 begins at step 105, in which a user can remove a handle 140 from a container 130 containing a predetermined volume of buffer fluid 135. The handle 140 has a swab 245 secured to one end that is pre-wetted with the buffer fluid 135. In other implementations, the user can separately apply a fluid that did not originate from the container 130 to the test surface. For example, the buffer fluid 135 can be provided separately, applied to the test surface, and absorbed using the swab 145. The buffer fluid 135 helps lift contaminants from the test surface into the swab.

At step 110, optionally in some embodiments the swab head can rotate to assist in making and maintaining contact between the swab 145 and the test surface 150. The handle 140 can have processing intelligence that communicates with the augmented reality device as described herein, for example by having a tracking beacon (e.g., reflector array, active radio frequency, position sensor, etc.) that can be used during sampling to enable a more accurate assessment of actual swabbed area.

At step 115, the user can swab a designated test area of the test surface 150. It can be preferable in some implementations to swab the entirety of the test area and only within the test area so as to generate an accurate measurement of the concentration of the contaminant, particularly for contaminants where even small quantities per area are harmful to users. The disclosed augmented reality devices can be used to assist with demarcating and tracking the swabbed area. Swabbing the entirety of the test area and only within the test area can also allow a reader device as described herein to generate an accurate measurement of the concentration of the contaminant per unit area in situations where a very small amount of contaminant is present. Even if the amount of contaminant detected is very small and not immediately harmful to persons in the immediate area, detection of contaminant in any amount can alert the user to a leak or unintended release of hazardous material. Further, for some hazardous drugs there is no safe exposure level. As such, some embodiments of step 115 can involve activating an augmented reality device to generate an area demarcation over the test area to assist the user with swabbing only a predetermined area, and can further involve monitoring the user's actions to determine the actual sampled area and/or when total sampling of the demarcated area is complete.

At step 120, the user can replace the swab 145 and handle 140 into the collection container 135. Optionally, the user and/or structure of the container can agitate the swab to release collected contaminants into the fluid within the container 135.

At step 125, the user can transfer fluid to a test device, such as but not limited to a cartridge 155 containing a lateral flow assay including a test strip. For example, the user can drip fluid from the container 130 onto a sample receiving zone of the test strip. In some embodiments, the cartridge 155 (or other test system) and container 130 can be structured to mechanically mate via a fluid-tight connection so as to prevent accidental exposure of potentially contaminated fluid to users and/or the testing environment.

Figure 1C:
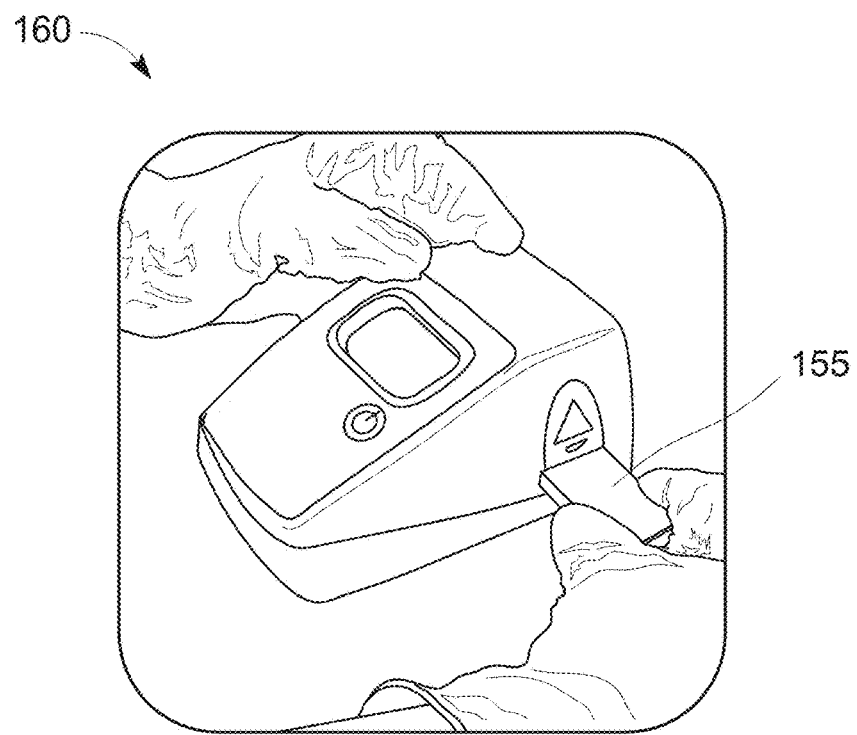
Figure 1D:
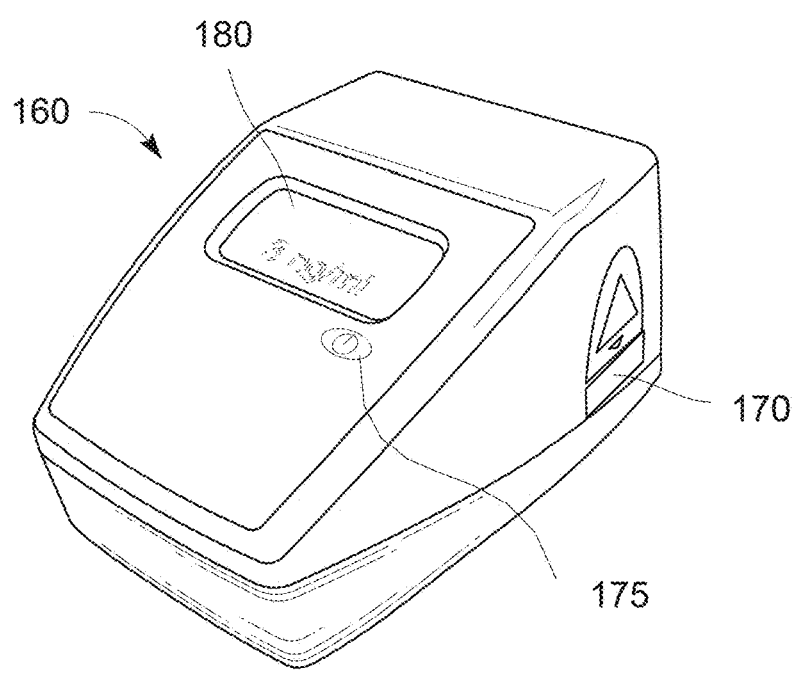

FIG. 1C illustrates a further step of inserting the cartridge 155 into an aperture 170 of reader device 160. Though not illustrated, further steps can include operating the reader device 160 to detect a result of the test (for example, by imaging the test strip), analysze the test result, and display results of the test. FIG. 1D illustrates the reader device 160 displaying a test result on display 180. In this case, the test result indicates a concentration of the analyte of interest of 3 ng/ml.

The device 160 can be an assay reader device having an aperture 170 for receiving an assay test strip and cartridge 155 and positioning the test strip so that the detection zones are positioned in the optical path of imaging components located inside the device 160. The device can also use these or additional imaging components to image a bar code on the cartridge, for example to identify which imaging techniques and analysis to perform.

Some embodiments of the device 160 can be configured to perform an initial scan using a bar code scanner to image one or more bar codes, for example provided on cartridges inserted into the aperture 170 or on separate identifiers. A bar code can identify the type of test to be performed, the person conducting the test, the location of the test, and/or the location in the facility of the test surface (for example pharmacy, nursing area, cabinet #, bed #, chair #, pump #, etc.). After reading any bar code identifiers the cartridge 155 is then inserted into the reader as shown in FIGS. 1A and 1C.

The device 160 can include a button 175 that readies the device for use and provides an input mechanism for a user to operate the device. In some embodiments device operation mode can be set via a number or pattern of clicks of the single button 175 of the device 160. For example, in some implementations a single press of the button 175 can power on the device 160 and set the device 160 to a default operation mode, and the device 160 can implement the default operation mode upon insertion of a cartridge. A double-click of the button 175 can initiate an alternate operation mode that is different than the default operation mode. Other numbers or patterns of pressing the single button 175 by a user can provide instructions to the processor of the device regarding a desired operation mode. Embodiments of a device 160 are described herein with reference to a single button, but other features allowing a user to select and switch between device operation modes are possible (such as but not limited to a single switch, knob, lever, or handle).

One example of a device operation mode is end-point read mode. In the end-point read mode, the user prepares and incubates the assay outside of the device 160 and tracks the development time of the assay. For example, an assay for determining Methotrexate or Doxorubicin concentration can have a development time of 5 minutes, so the user would apply the fluid to the assay from a collection device as described herein and wait for 5 minutes. At the end of the 5 minutes the user would insert the assay 155 into the device 160 to obtain a test result. Accordingly, when operating in end-point read mode the device 160 can provide instructions, for example audibly or on a visual display, that instruct a user to wait for a predetermined time after applying a sample to an assay before inserting the assay in the device 160. In other embodiments, when operating in end-point read mode the device 160 may not display any instructions but may simply read an assay upon insertion into the device 160. Upon insertion of the assay into the base device 160, an optical reader of the device can collect data (for example, image data) representing the assay for analysis in determining a result of the assay. In some embodiments end-point read mode can be the default operation mode of the device 160.

Another example of a device operation mode is walkaway mode. When operating in walkaway mode, the device 160 can provide instructions for the user to insert the assay immediately after or during application of the sample. In the walkaway mode according to one embodiment, the user can apply the specimen to the assay and immediately insert the assay into the device 160. The assay will develop inside the device 160 and the device 160 can keep track of the time elapsed since insertion of the assay 155. At the end of the predetermined development time, the device 160 can collect data (for example, image data) representing the assay. In implementations where the device 160 is an imaging reader, the device 160 can analyze the image data to determine a test result, and report the test result to the user. The assay development time can be unique to each test. In some embodiments walkaway mode can be set by double-clicking the single button 175 of the device 160. Further input can indicate the assay development time to the reader device. For example, a barcode scanned by a barcode reader of the device 160, or a barcode provided on the assay or on a cartridge used to hold the assay, can indicate to the device 160 a type of assay that is inserted and a development time for that assay. Based upon the type of assay, the device 160 can wait for the predetermined amount of time after sample application and insertion before collecting image data representing the assay.

There are many advantages associated with the ability of a user to select and switch between device operation modes in implementations of base assay analyzers described herein. The endpoint read mode can be convenient in large laboratories or medical practice facilities where personnel typically batch process a number of tests. The walkaway mode can be useful when a single test is being performed, or when the end user does not want to have to track the assay development time (or is not knowledgeable or not trained on how to track the assay development time accurately). The walkaway mode can advantageously reduce or eliminate the occurrence of incorrect test results due to an assay being inserted and read (for example, imaged) too quickly (too soon before the development time of the assay has elapsed) or too slowly (too long after the development time of the assay has elapsed). Further, in walkaway mode the assay reader can operate to capture multiple images of the assay at predetermined time intervals, for example when a kinetic graph of the assay readings is desired.

One embodiment of the disclosed device 160 includes only a single button 175 on its exterior housing, such as a single power button that powers the device 160 off and on. Embodiments of the disclosed device 160 also implement two different device operation modes (although more than two device operation modes are possible). In order to enable the end user to select and switch between the two device operation modes, the device 160 can include instructions to implement a double-click function on the power button. After receiving input of a single press of the button to power on the device, insertion of an assay cartridge can automatically trigger end-point read mode. When the processor of the device receives input from a user double-clicking the power button, this can initiate the stored instructions to implement the walkaway mode. This double-click functionality offers a simple and intuitive way for the end user to switch between different operation modes of the base assay analyzer. The double-click functionality also enables the user to configure the device in real time to operate in the walkaway mode without requiring any additional configuration steps or additional programming of the device 160 by the user. It will be appreciated that the device 160 can be provided with instructions to recognize other click modes instead of or in addition to the double-click to trigger secondary (non-default) device operation modes, for example to recognize a user pressing the button any predetermined number of times, pressing the button in a predetermined pattern, and/or pressing and holding the button for a predetermined length of time.

As described above, the device 160 can also include a display 180 for displaying instructions and/or test results to the user. After insertion of the test strip, the device 160 can read a bar code on the assay test strip to identify the name, permissible concentration ranges of the drug, and/or maximum permissible concentration of the drug. The device 160 can image the inserted test strip, and analyze the signals representing the imaged test strip to calculate results, display the results to the user, and optionally transmit and/or locally store the results. The results can be calculated and displayed as contamination with an indication of positive or negative (for example, +/−; yes/no; etc.), and/or the actual amount of contamination (analyte of interest) per area (for example, Drug Concentration=0.1 ng/cm$^2$) and/or actual amount of contamination (analyte of interest) per volume of buffer solution (for example, Drug Concentration=3 ng/ml). These indications are non-limiting examples as other indications and measurement units are also suitable.

Some embodiments of the device 160 may simply display the result(s) to the user. Some embodiments of the device 160 may also store the result(s) in an internal memory that can be recalled, for example, by USB connection, network connection (wired or wireless), cell phone connection, near field communication, Bluetooth connection, and the like. The result(s) can also automatically be logged into the facility records and tracking system of the environment (for example, facility) where the test is performed. The device 160 can also be programmed to automatically alert any additional personnel as required, without further input or instruction by the user. For example, if the device 160 reads contamination levels that are above the threshold of human uptake and considered hazardous to for human contact, a head pharmacist, nurse, manager, or safety officer can be automatically notified with the results and concentration of contamination to facilitate a rapid response. The notification can include location information, such as but not limited to a geographic position (latitude/longitude) or description of location (Hospital A, Patient Room B, etc.). That response may include a detailed decontamination routine by trained personnel or using a decontamination kit provided together or separately from the hazardous contamination detection kit.

In some embodiments, device 160 can be a special-purpose assay reader device configured with computer-executable instructions for identifying trace concentrations of contaminants in the samples applied to test strips. In other embodiments other suitable liquid sample test systems can be used to identify the presence and/or concentration of a hazardous drug.

Overview of Example Devices and Techniques for Augmented Reality Area Sampling

Figure 2:
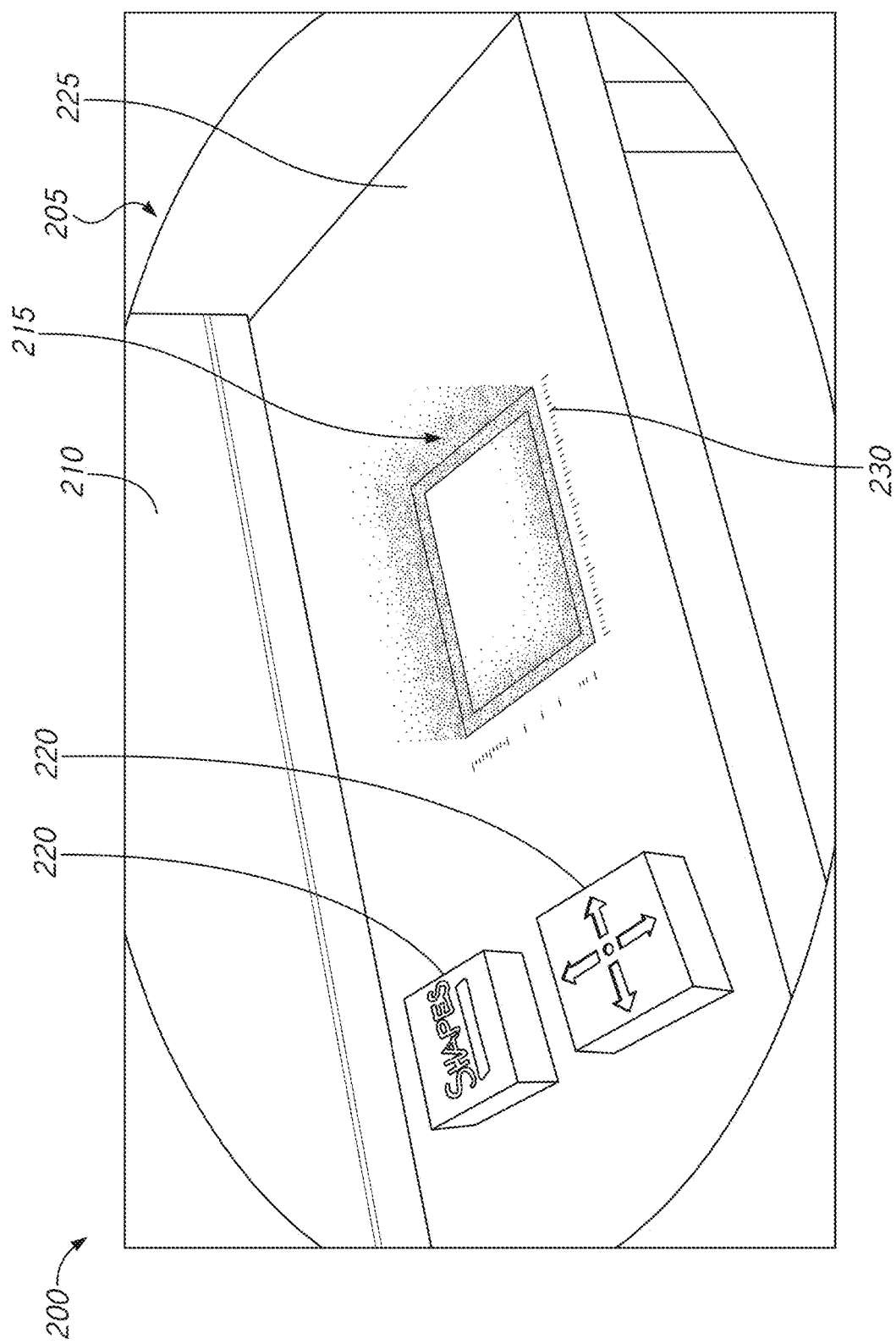
FIG. 2 depicts an example augmented reality display of a test area sampling environment as described herein.

FIG. 2 depicts an example augmented reality display 200 of a test area sampling environment 210 as described herein, which can be displayed for example at block 115 of the process 100 described above. The sampling environment 210 includes a surface 225 identified for hazardous contamination sampling. The surface 225 may be suspected of having hazardous contamination or known to have hazardous contamination. In some cases, the surface 225 is suspected of not having hazardous contamination but is tested periodically, for example as part of a routine maintenance program, to confirm there is in fact no hazardous contamination. In some examples, a user tests the surface 225 based on a pre-established routine maintenance schedule, such as on the half hour, hourly, daily, weekly, monthly, or some other periodicity.

Surface 225 can be in a pharmacy where hazardous drugs are handled or dispensed, in an environment used for treatment of patients with hazardous drugs, or an environment used for storage, testing, or manufacturing of hazardous drugs, to name a few non-limiting examples. For example, surface 225 can be a biological safety cabinets and isolators ("glove box"), countertops of varying materials and locations, floors, IV poles, and administration areas (e.g., chairs, desktops, keyboards, computer screens). Other examples of surface 225 include locations of drug transport such as shipping containers, carts, and storage areas (e.g., shelving and refrigerators). It will be understood that implementations of augmented reality devices described herein can be suitable to assist and/or instruct a user to swab any number of surfaces that may include a hazardous drug molecule or any other analyte of interest.

The augmented reality display 200 is illustrated as being presented within the field of view of a window 205, for example of augmented reality goggles or glasses. Other examples may have varying shapes for window 205 or no window at all, depending upon the type of device used to generate and provide the augmented reality display 200.

In some implementations, the augmented reality display 200 can be provided for an initial testing of the surface 225. In one example, testing of the surface 225 can proceed according to FIGS. 1A-1D described above. Other sampling procedures and testing devices can be used in other examples. In some implementations, the augmented reality display 200 can again be displayed for follow-up testing of the surface 225, for example a periodic re-check of the surface 225 or a confirmation testing occurring after executing decontamination procedures to decontaminate the surface 225.

The augmented reality display 200 includes digitally-generated visual elements displayed as an overlay over the real world test area sampling environment 210. These include an area demarcation boundary 215, distance markings 230, and user-interface elements 220. It will be appreciated that the specific locations, shapes, and visual presentations of these elements can vary in other embodiments while still providing the disclosed functionality. The example augmented reality display 200 includes three-dimensional representations of the augmented reality overlay elements; some or all elements can be displayed as two-dimensional representations in other embodiments.

The area demarcation boundary 215 denotes the specified area for sampling the surface 225 for the potential presence of a hazardous contaminant and is accompanied by distance markings 230 to provide visual indications to the user regarding the dimensions of the area demarcation boundary 215. In some embodiments, the distance markings 230 can be displayed during pre-sampling setup procedures in order to allow the user to select a specific area for testing. In some examples, the distance markings 230 may not be displayed during sampling.

As described herein, having a precise calculation of the sampled area can allow a concentration of any detected contaminant per unit area of the sampling surface 225 to be determined with very high accuracy. Thus, in addition to displaying the area demarcation boundary 215, an augmented reality device as described herein can also monitor sample collection processes to perform one or more of the following: (i) identify a percentage of the area actually sampled, (ii) identify any additional area outside of the area demarcation boundary 215 that was sampled, (iii) compute total actual sampled area, and (iv) provide an indication when the total area has been sampled.

The example user-interface elements 220 include a shape selection button and a location adjustment button. The shape selection button can allow the user to select a shape and/or size for the test area demarcation boundary 215. For example, the user can "touch" the user-interface elements 220 by placing a hand or finger on or within the illustrated 3D volume to select features of the test area demarcation boundary 215?. In other implementations the test area shape and size can be predefined and the shape selection button can be omitted. The location adjustment button can allow the user to move the position of the test area demarcation boundary 215 in at least one direction across the surface 225. In some embodiments, the device used to display the augmented reality display 200 can analyze an image of the test area sampling environment 210 and automatically identify a height and/or contour of the surface 225, and can overlay the test area demarcation boundary 215 onto the determined height and/or contours of the surface 225. Other examples can have varying buttons providing various user-input features as required for system operation and sample acquisition procedures.

Figure 3:
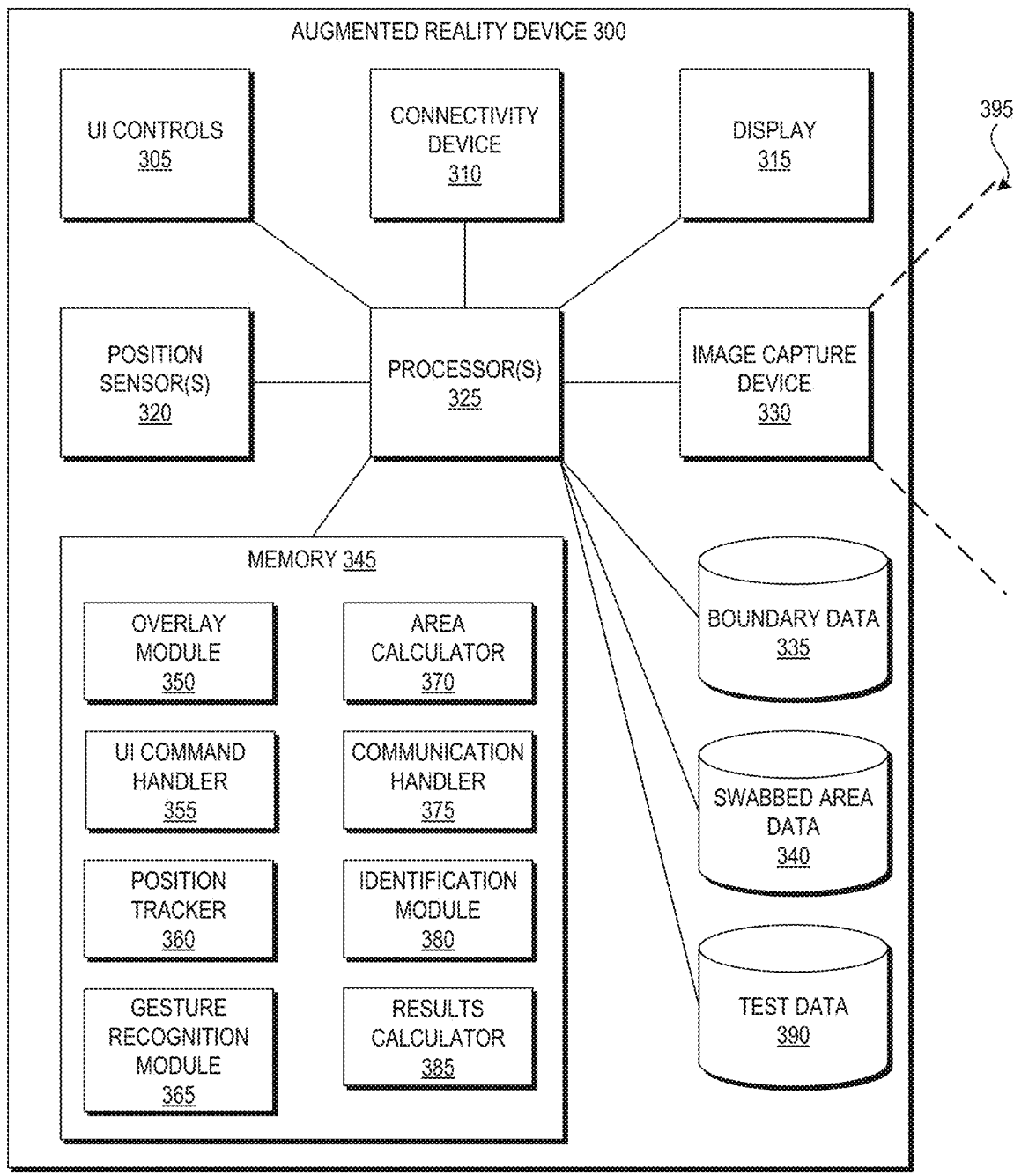
FIG. 3 depicts a high level schematic block diagram of an example augmented reality device that can be used to generate and display the example display of FIG. 2.

FIG. 3 depicts a high level schematic block diagram of an example augmented reality device 300 that generates and displays the example display of FIG. 2. The device 300 includes a number of different components for generating and presenting augmented reality views to a user, for example image capture device 330, display 315, processor(s) 325, connectivity device 310, user interface controls 305, position sensor(s) 320, a working memory 345, and a number of data repositories. The data repositories include boundary data repository 335, swabbed area data repository 340, and test data repository 390. Though shown separately in FIG. 3 for purposes of clarity in the discussion below, it will be appreciated that some or all of the data repositories can be stored together in a single memory or set of memories. The working memory 345 stores a number of processing modules including overlay module 350, UI command handler 355, position tracker 360, gesture recognition module 365, area calculator 370, communication handler 375, identification module 380, and results calculator 385. Each module can represent a set of computer-readable instructions, stored in a memory, and one or more processors configured by the instructions for performing the features described below together.

The device 300 can be any device suitable for a creating a visual experience that blends digital content (e.g., the example augmented reality overlay of FIG. 2) with the physical world (e.g., the test environment) into a composite scene. For example, device 300 can be a wearable device configured to display the augmented reality overlaying the test environment to one or both eyes of a user. Device 300 can be implemented as a heads up display, augmented or virtual reality goggles, smart glasses, or any suitable immersive or see-through augmented reality system. Immersive displays block a user's view of the real world, for example presenting an image of the real world scene with a digital overlay, while see-through systems leave the user's view of the real world open and display an image overlaying the view.

Image capture device 330 acquires images of the test environment. In some embodiments, these images can be displayed to the user with an augmented reality overlay as described herein. In other embodiments, the images can be used by the processor(s) 325 to generate and/or maintain positioning of the augmented reality overlay (e.g., user interface) for example using a transparent display, though the images themselves may not be displayed to the user. The device 300 can also use images captured by the image capture device 330 to determine information relating to a test, or to determine test results. For example, the device 300 can identify in a captured image any number of markings on a swab or test strip, for example a unique identifier (e.g., 1D or 2D barcode, QR code, serial number etc.) that identifies the swab and/or test strip used. The image capture device 330 can also be used to record the location where the sample is taken (e.g., visual cues or identifiers on a pharmacy hood or on the test surface). Using image data from the image capture device 330, the device 300 can create a tracking record of all items used during sample collection and test result calculation, all areas collected from, and can use this data to generate proper documentation of the testing events and results.

The image capture device 330 can comprise, in various embodiments, a charge-coupled device (CCD), complementary metal oxide semiconductor sensor (CMOS), or any other image sensing device that receives light and generates image data in response to the received image. A sensor of the image capture device 330 can have an array of a plurality of photosensitive elements. The photosensitive elements can be, for example, photodiodes formed in a semiconductor substrate, for example in a CMOS image sensor. A number of pixels in captured images can correspond to the number of photosensitive elements in some embodiments.

The display 315 of the device 300 can present a composite scene of a test environment and augmented reality overlay to a user. The display 315 can be a variety of display panels (e.g., LED, LCD, OLED panels) or optical materials (e.g., transparent glass and/or plastic lenses or panels) as described below. In some implementations the display 315 may be a near-eye wearable display. In some implementations display 315 can be a stereoscopic display or displays by which each eye is presented with a slightly different field of view so as to create a 3D perception of the composite scene.

In some implementations, the display 315 may be transparent or translucent so that the user can see the test environment through the display 315, with the display 315 used to present the augmented reality overlay. In such embodiments, the augmented reality overlay can be projected onto the display 315 by a projection device positioned to emit light into or onto the display 315, or the augmented reality overlay can be presented by changing visual appearance of pixels of the display 315. Thus, the display 315 may be incorporated into the transparent lens(es) of a pair of goggles or glasses or of a heads-up display panel.

With a see-through (e.g., transparent or translucent) near-eye optical system, the augmented reality overlay may not be displayed in-focus on the display surface. Within a certain close range of distances from a user's eye, displaying the overlay in-focus on a semi-transparent surface may not create an effective composite scene, as the human eye cannot comfortably focus on something too close (e.g., within 6.5 cm for a typical human eye). Thus, rather than presenting the overlay on the surface, the display 315 can include an optical system configured to form an optical pupil and the user's eye can act as the last element in the optical chain, thereby creating the in-focus image of the overlay on the eye's retina. For example, a see-through near-eye display can include an illumination source configured to emit light representing the augmented reality overlay and a waveguide optical element which collects the light and relays it towards the user's eye. Such an arrangement can form the optical pupil and the user's eye acts as the last element in the optical chain, converting the light from the pupil into an image on the retina. This structure can allow for non-transparent portions of the display 315 to be positioned so as to not obstruct the user's view, for example on the side of the head, leaving only a relatively small transparent waveguide optical element in front of the eye.

Other embodiments of the display 315 can include an opaque display panel, for example incorporated into an augmented or virtual reality headset. An opaque display 315 may alternatively be incorporated into another computing device in some implementations, for example a user's smartphone or another wearable-sized computing device. As such, in some embodiments the device 300 can include a wearable structure for holding the display 315 of the computing device 300 in the field of view of the user. The various modules and memory components illustrated in FIG. 3 can be incorporated into the computing device and/or a sampling application adapted to run on the computing device, into the wearable structure, or split between the two in various embodiments.

Some embodiments of device 300 can be a virtual retinal display device that projects augmented reality overlays directly onto the retina of a user's eye. Such devices can include a projection device, for example a light source and one or more lenses, in place of a display panel.

Device 300 can include one or more position sensors 320. For example, a position sensor can be an accelerometer or gyroscope that may be used to detect in real time the viewing angle or gaze direction of the user. This data can be used to position or re-position the overlay relative to the real-world test environment so that displayed features, for example the boundary of the test area, appear to maintain static positioning relative to the test environment. To illustrate, the user may set the boundaries of the test area before swabbing, and then may turn her head during swabbing of the test area to track the motion of the swab. The device 300 can track the gaze direction of the user and can use this direction information to keep the positioning of the visual representation of the test area boundary consistent and stationary relative to the test surface, even while the user turns her head. As this adjustment is carried out in real time, an illusion of the augmented reality overlay merging with physical elements of the real world may be achieved.

Connectivity device 310 can include electronic components for wired and/or wireless communications with other devices. For example, connectivity device 310 can include a wireless connection such as a cellular modem, satellite connection, or Wi-Fi, or via a wired connection. Thus, with connectivity device 310 the device 300 can send or upload data to a remote repository via a network and/or receiving data from the remote repository. As such, the data relating to test area swabbing generated by device 300 (for example but not limited to test area boundary size and actual area sampled), can be provided to remote data repositories, for example in test devices used to analyze the collected samples. A module having a cellular or satellite modem provides a built-in mechanism for accessing publicly available networks, such as telephone or cellular networks, to enable direct communication by the device 300 with network elements or testing devices to enable electronic data transmission, storage, analysis and/or dissemination. In some implementations this can be performed without requiring separate intervention or action by the user of the device, for example upon detecting completion of sampling (e.g., identifying via automated image analysis that the user has inserted the swab into a container and thus completed sampling). In some embodiments connectivity device 310 can provide connection to a cloud database, for example a server-based data store. Such cloud based connectivity can enable ubiquitous connectivity of a network of augmented reality test devices without the need for a localized network infrastructure. Further, in some examples connectivity device 310 can enable wireless transmission of software updates to the device 300 (and to similar devices within a designated environment or group of users), for example relating to updates to size and/or location of test areas within a clinical environment, updated test analysis algorithms, updated threshold concentration levels, software fixes, and the like.

Device 300 can include UI controls 305, for example mechanical buttons, touch-sensitive buttons, a touch-sensitive panel, joysticks, input wheels, and the like for receiving input from a user regarding operation of the device 300. Some implementations can additionally or alternatively receive user input by analyzing images from the image capture device 330, for example to identify known command gestures, interaction with elements displayed in the augmented reality overlay (e.g., user-interface elements 220), and/or to track the position of a user's hand and/or a swab during sampling.

Processor(s) 325 include one or more hardware processors configured to perform various processing operations on received image data for generating and displaying augmented reality overlays, defining test areas, and tracking sampled areas, for example. Processor(s) 325 can include one or more of a dedicated image signal processor, a graphics processing unit (GPU), a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

As shown, processor(s) 325 are connected to a working memory 345 storing a number of modules. As described in more detail below, these modules include instructions that configure the processor(s) 325 to perform various image processing and device management tasks. Working memory 345 may be used by processor(s) 325 to store a working set of processor instructions contained in the modules of memory 345. Working memory 345 may also be used by processor(s) 325 to store dynamic data created during the operation of device 300. In some implementations, a design may utilize ROM or static RAM memory for the storage of processor instructions implementing the modules contained in memory 345. The processor instructions may be loaded into RAM to facilitate execution by the processor(s) 325. For example, working memory 345 may comprise RAM memory, with instructions loaded into working memory 345 before execution by the processor(s) 325.

Boundary data repository 335 is a data storage device that stores data representing size and location of a test area boundary. For example, boundary data repository 335 can store dimensions (e.g., width and length) of a test area, and can further store information regarding positioning of the test area boundary relative to one or both of the device 300 and automatically-identified features in image data representing the test area. Thus, the boundary data repository 335 can store information regarding size and location of the test area boundary within a three-dimensional coordinate frame around the device 300. In some implementations, boundary data repository 335 can store a number of options regarding test area boundaries (e.g., different sizes) and these options can be made available for selection by the user at the beginning of setup for contaminant sampling. In some implementations, the device 300 can automatically select a test area boundary size for a particular sampling process, for example using information identifying one or more of the test area, a sample collection kit being used for the test area sampling, and a test device that will be used to test the sample. In some implementations, the data in the boundary data repository can be input by a user, either manually via user input controls or via a detected gesture input, for example by the user drawing a boundary over the test area with a hand.

Swabbed area data repository 340 is a data storage device that stores data representing the actual area swabbed during a hazardous contaminant sampling procedure. The swabbed area data repository 340 can be updated during the course of a sampling procedure to reflect the unit area (e.g., $cm^2$) and/or percentage (of demarcated or non-demarcated) test area that has been swabbed by a user. This data can be determined by the area calculator module 370 as described in more detail below.

Test data repository 390 is a data storage device that stores information relating to the sampling procedure. This data can include identifiers representing an operator performing the procedure, the location of the test area, a sampling kit or device used to collect the sample from the test area, a test device to analyze the collected sample, and the specific antineoplastic drug or other contaminant sought to be detected by the testing, to name a few non-limiting examples. The data in test data repository 390 can include parameters of the collection and/or test devices in some implementations, for example parameters relating to area sampling such as swab size. The test data repository 390 can also include specific personnel associated with a sampling procedure as well as contact information for such personnel.

In some implementations, the test data repository 390 can be used to store and analyze aggregate test data from a specific location, by a specific user, or using a particular type of collection/test device at a number of different points in time. The test data repository 390 can also be used to store aggregate test data from a number of different test environments or sampling locations. Thus in some embodiments the test data repository 390 may be stored on, or mirrored to, a remote data repository, for example a repository in network communication with a network of different augmented reality devices and test devices. Beneficially, this can increase traceability of the sampling procedures performed by storing information on devices used for tests, areas sampled, results of sample analysis, and associated documentation regarding test operators.

Identification module 380 is a module configured to identify data relating to the sampling procedure, for example the types of data described as stored in the test data repository 390 as described above. The identification module 380 can be configured to receive information regarding a scanned or imaged bar code, serial number, or other identifier and identify a corresponding user, test area, collection device, test device, and the like. For example, locations identified for sampling (e.g., a pharmacy hood or counter) can be pre-marked with a reflector array, bar code, or other identifier that would help the device 300 identify the test area as a pre-identified specific location. In some embodiments, information generated by the identification module 380 can be used to select or recommend a test area size for a particular sampling procedure.

UI command handler 355 is a module configured to manage system operations in response to user commands. For example, UI command handler 355 can store a test area boundary size in the boundary data repository 335 in response to user drawing, selection, or other input commands designating the size and/or location of the test area boundary. UI command handler 355 can also cause storage and/or transmission of test data (e.g., actual sampled area and other information stored in the data repositories 335, 340, 390) to remote devices (e.g., a database of a healthcare organization, a test device) in response to user commands.

Overlay module 350 is a module configured to generate, update, and cause display of augmented reality overlays. As described herein, an overlay can include a visual representation of a test area and/or test area boundary displayed over the test surface in order to guide a user in sampling a specific area. An overlay can also include modifications to the visual representation of the test area to indicate areas that have already been swabbed (e.g., change in color, brightness, or pattern overlaying the test area or even areas outside the test area that were swabbed unintentionally). Some embodiments can display a trail or track where swabbing has occurred. An overlay can further include various user interface elements in some implementations. In some embodiments, the overlay can include visually-displayed instructions to guide the user through the various steps of the sampling process. In some cases, audible instructions are provided to the user. The sizes, locations, and orientations of elements of an augmented reality overlay may be fixed relative to the three-dimensional coordinate frame around the device 300, and during display of the augmented reality overlay the elements can be positioned according to their fixed sizes, locations, and orientations within the coordinate frame even as the field of view of the device 300 changes.

Position tracker 360 is a module configured to track location of the test area throughout a sampling procedure. Initially, the position tracker 360 can be used to establish a position for the test area (e.g., its size and location) relative to the test environment and/or device. As described above, the test area can be mapped to the three-dimensional coordinate frame surrounding device 300. In some embodiments, the position tracker 360 can set the test area location relative to features identified in images of the test environment (e.g., the test surface). In some embodiments, the position tracker 360 can set the test area location relative to the initial positioning of the device 300 as determined by the position sensor(s) 320. Position tracker 360 stores this data in the boundary area data repository 335, and can receive data from the image capture device 330 and/or position sensors 320 in order to track the location of the test area relative to one or both of the device 300 (e.g., by using data from position sensors 320 to identify movement of the device) and the real-world test environment (e.g., through automated image analysis). The position tracker 360 can additionally track the movement of the device 300 and/or the field of view of the image capture device 330 through the coordinate frame, and can use this information in combination with the stored sizes, locations, and orientations of overlay elements in order to determine how to position specific overlay elements within the area of the overlay. Position tracker 360 can thus cooperate with the overlay module 350 to maintain a consistent location of the visual representation of the test area boundary in overlays presented to the user. For example, as the user moves throughout the test environment, the position tracker 360 can send updates to the overlay module 350 regarding where to position the test area depiction in the overlay, so that the depiction of the test area can be displayed in the same position relative to the real-world test environment even as the user moves.

Gesture recognition module 365 is a module configured to identify gestures made by a swab, or by the hands and/or fingers of a user. Such gestures can include, for example, command gestures (e.g., initiate swab tracking, swabbing complete), swabbing motions (e.g., for tracking actual swabbed area), and press, select, drag, and/or swipe gestures for interacting with buttons or other augmented reality overlay user interface features. In some embodiments, the device 300 may be provided together with one or more trackers that the user can wear on fingers or hands, or secure to a sampling swab handle, to facilitate gesture recognition and sampled area tracking. Such trackers can include accelerometers, gyroscopes, electromagnetic (EM) position sensors passing through an EM field generated around the test environment, and other suitable position sensors, and/or can include optical markers (e.g., specifically-colored materials or reflective materials). Similarly, a swab provided for use with the device 300 can have processing intelligence that communicates with the device 300, for example by having a tracking beacon (e.g., reflector array, active radio frequency, position sensor, etc.) that can be used during sampling to enable a more accurate assessment of actual swabbed area. Position sensors can communicate with the device 300 via the connectivity device 310 in some implementations. In the case of optical markers, the gesture recognition module can include instructions to identify and track the location of such markers in data received from the image capture device 330. In some embodiments, the boundary of a sample collection swab can be marked with optical markers in order to facilitate determination by the device 300 of actual area of the test surface that passes underneath the swab material. Gesture recognition module 365 can identify pixels in captured images that correspond to the test area, can identify and log (in swabbed area data repository 340) one or both of pixels that correspond to locations that have been swabbed and pixels that correspond to locations that have not been swabbed, and can determine when the number and locations of logged swabbed and/or unswabbed pixels indicate that the entire test area has been swabbed.

Area calculator 370 is a module configured to calculate the actual area swabbed during a sampling procedure. Area calculator 370 can receive one or more of the following: (i) data from the boundary data repository 335 regarding a set size and location of the test area within the three-dimensional coordinate frame set by device 300, (ii) data from the overlay module 350 regarding a current position of the test area in an augmented reality overlay and/or field of view 395 of image capture device 330, (iii) data from the gesture recognition module 365 regarding movement of the swab and/or a user's hand through the test area during sample collection, and (iv) data from the test data repository 390 regarding swab size. Area calculator 370 can use the received data to calculate the actual area that has been swabbed during sample collection (both within and outside of the designated test area boundary) and/or percentage of the test area that has been swabbed. In some examples, the amount of swabbed area outside of the test area boundary can be used to adjust the confidence level of the test result (the presence and/or concentration of the contaminant of interest).

In one example, the area calculator 370 can receive data from the swabbed area data repository 340 identifying logged pixels from a plurality of images that are determined to have been swabbed by the user, can use a mapping between the scene depicted in each image and the three-dimensional coordinate frame to determine a two-dimensional area of the test surface represented by the logged swabbed pixels, and can use distance measurements within the three-dimensional coordinate frame to determine the swabbed area represented by the two-dimensional area of the test surface. Though described in the context of an example flat test surface, such area calculations can also factor in any identified three-dimensional contours of the test surface.

Some embodiments of the area calculator 370 can compare the swabbed area to a threshold or predetermined minimum area, and the device 300 can alert a user when an area greater than or equal to the predetermined minimum area has been swabbed. As such, some embodiments of the device 300 may not require marking of a specific area, but rather can keep a running tally of total swabbed area for comparison to the predetermined minimum area.

Optionally, some embodiments of the device 300 can include the results calculator 385. Results calculator 385 is a module configured to determine the presence and/or concentration of a hazardous drug in a liquid sample, for example a sample collected using the guidance provided by the device 300. For example, the results calculator 385 can receive image data representing an image depicting a test device from the image capture device 330. In one example, the image can depict the display of such a test device, with the display providing an indication of the presence and/or concentration of a hazardous drug. The results calculator 385 can identify the test results indicated in the image of the display. In another example, the results calculator 385 can receive image data representing an image depicting a test strip, for example a lateral flow assay test strip including one or more test areas and one or more control areas. In such examples, the results calculator 385 can identify the saturation level (or other optically-detectable change) of any test and control areas of the test strip based on color and/or intensity values of pixels corresponding to the locations of the lines on the test strip, and can use the identified saturation level to determine the presence and/or concentration of the hazardous drug based on the identified saturation level(s). For example, in a competitive lateral flow assay a test area can be configured to produce full saturation (color intensity) with no sample, and a sample with a range of antineoplastic drug concentrations will yield less than a maximum saturation. The test areas of non-competitive assays can produce no saturation with no sample, and a sample with a range of antineoplastic drug concentrations will yield a range of saturations up to a concentration that corresponds to full saturation.

In order to associate specific pixels in the image of the test strip with the locations of one or more lines on the test strip and to associate specific saturation levels with specific concentration levels, the device 300 can access test strip configuration data in the test data repository 390 (for example as identified from an imaged barcode on a test strip cartridge). In some examples, an augmented reality overlay on the display 315 of the device 300 can present an outline on the display 315 showing a desired placement for the test strip during test strip imaging in order to aid in identifying the locations of the one or more lines. The device 300 can monitor captured images received from image capture device 330, can determine when the test strip has been placed according to the outline, and can analyze an image of the test strip in the desired placement to determine saturation levels.

Communication handler 375 is a module configured to manage communication from device 300 to external devices using the connectivity device 310. For example, communication handler 375 can be configured to transmit test data (e.g., actual sampled area and other information stored in the data repositories 335, 340, 390) to remote devices (e.g., a database of a healthcare organization, a test device used to analyze the sample) in response to commands identified by the UI command handler 355. In some embodiments, such data can be sent automatically without requiring further input from the user upon the occurrence of a specific event, for example completion of sampling. Device 300 can programmatically identify completion of sampling in a number of different ways including an explicit indication by the user (e.g., selection of a "sampling completed" UI element), implicit indications by the user (e.g., leaving the test environment, inserting the swab into a collection container), or a predetermined period of time after initiation of the device 300 for guidance of area sampling.

Communication handler 375 can also handle transmission of any alerts to personnel associated with a sampling procedure, for example alerts that sampling has been completed and/or that the test area was sampled according to pre-specified performance standards. In some embodiments the device 300 may determine the results of testing the collected sample and can additionally or alternatively provide alerts regarding any identified hazardous contaminant. The alerts can be provided locally within the test environment and/or externally to authorized personnel. For example, the augmented reality device can display a hazard indication, overlay of red or other color, or other visual indication of contamination over the test area. Other alert options include emitting an audible tone (e.g. a beep) or audible warning of the contamination. In some embodiments, this information can be communicated through a network such that any user wearing a networked augmented reality device 300 who enters the test environment sees or hears the alert until subsequent testing indicates successful decontamination of the environment. Thus, some embodiments of the disclosed augmented reality devices can form a network within a healthcare setting for providing alerts to users regarding contamination status of various environments within the healthcare setting. Such networked devices can be provided to healthcare workers, patients, visitors, and other workers within the environment.

Figure 4:
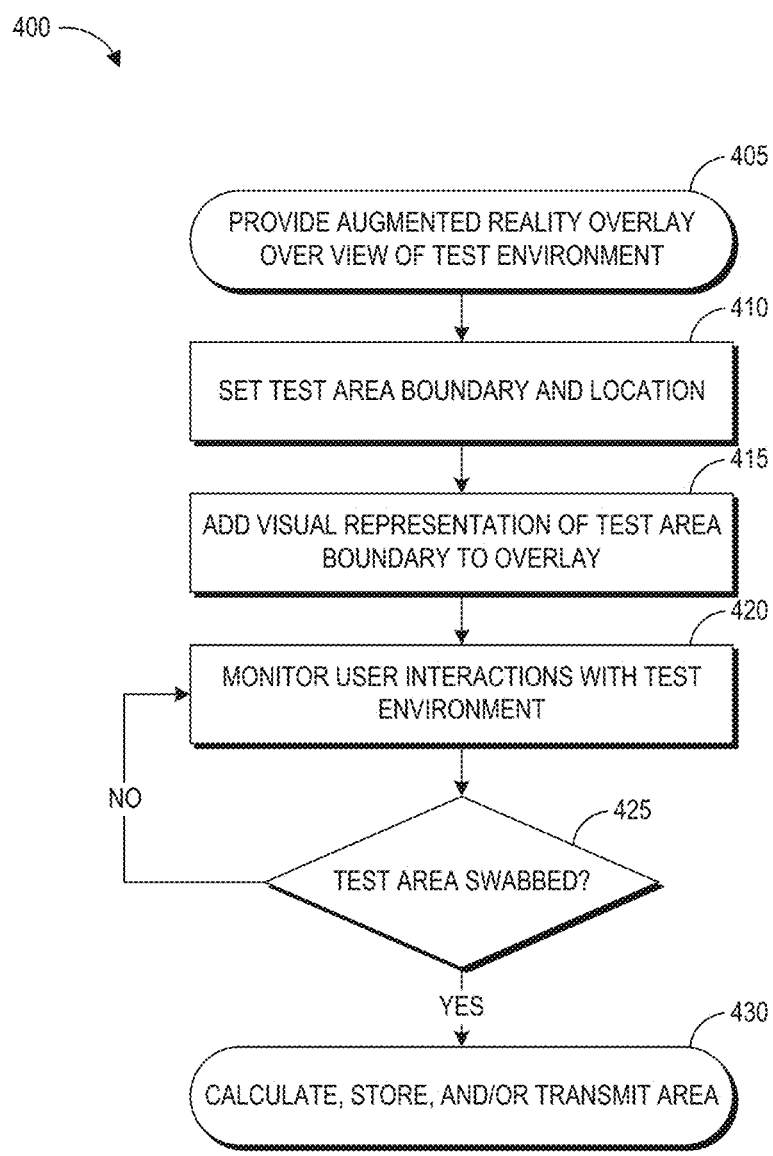
FIG. 4 illustrates an example process for implementing an augmented reality test area sampling environment, for example the display of FIG. 2.

FIG. 4 illustrates an example process 400 for implementing an augmented reality test area sampling environment, for example providing the display of FIG. 2 using the device 300 of FIG. 3.

The process 400 begins at block 405, in which the overlay module 350 and display 315 of device 300 provide an augmented reality overlay over a view of the test environment. As described above, the view of the test environment can be a direct view through a transparent display or an indirect view of an image captured of the test environment.

At block 410, the position tracker 360 can set the size and/or location of the test area boundary on a surface of the test area sampling environment. In some implementations the UI command handler 355 can receive user input indicating the size and/or location of the test area boundary set by the user. For example, the user can select the test area from a predetermined range of sizes or can manually input the dimensions of the test area. In another example, the device 300 may identify through analysis of a series of image frames (e.g., a video) that the user draws the test area over the test surface. In some examples, the device 300 can automatically identify the test area size and/or position, for example based on the type or location of the sampling.

At block 415, the overlay module 350 can add a visual representation of the test area and/or the test area boundary to the augmented reality overlay. For example, the border of the test area can be displayed as a two-dimensional rectangle or a three-dimensional box. As another example, the color and/or brightness of the test area can be changed to visually distinguish the test area from surrounding areas.

At block 420, the position tracker 360 and gesture recognition module 365 can monitor user interactions with the test environment. These interactions can include the user contacting the surface within the test area with a sampling swab and moving the sampling swab across the surface. Block 420 can include monitoring a position of the swab within the test area (and optionally identifying swabbing outside of the test area) and in some implementations can further include confirming that the swab is in contact with the test surface. At block 420, the device 300 can also provide a notification to the user when he swabs outside of the test area too often or too much.

At decision block 425, the device 300 can determine whether the entire test area has been swabbed. If not, the process 400 loops back to block 420 to monitor user interactions with the test environment. The device can visually indicate to the user what areas have not been swabbed, for example by overlaying the unswabbed area with a color, pattern, texture, etc.

If the device 300 determines at block 425 that the entire test are has been swabbed, some implementations can transition automatically to block 430. Other implementations can transition to block 430 after receiving a user input that sampling is completed or by programmatically identifying completion of sampling. At block 430, the device 300 can calculate, store, and/or transmit the sampled area. For example, the area calculator 370 can generate a final calculation of the actual area sampled by the user during the process 400. This calculation can be stored in the swabbed area data repository 340 in association with the sampling procedure in some embodiments. In other embodiments, the communication handler 375 can cause transmission of the final calculated area and any other specified information relating to the test to a remote device, for example a test device designated for analyzing the liquid sample and/or healthcare facility database.

Thus, by using device 300 and process 400, a user can be confident that the proper area has been swabbed and/or that the test device has precise information regarding the swabbed area. Beneficially, this enables more accurate determinations (by device 300 or another testing device) regarding the concentration of any detected contaminant on the test surface.

FIGS. 2-4 discussed above represent one embodiment for accurately tracking sampled area during surface contamination testing using a wearable augmented reality display device 300. FIGS. 5A-7, discussed below, represent another embodiment for accurately tracking sampled area using an augmented reality projection device 600.

Figure 5A:
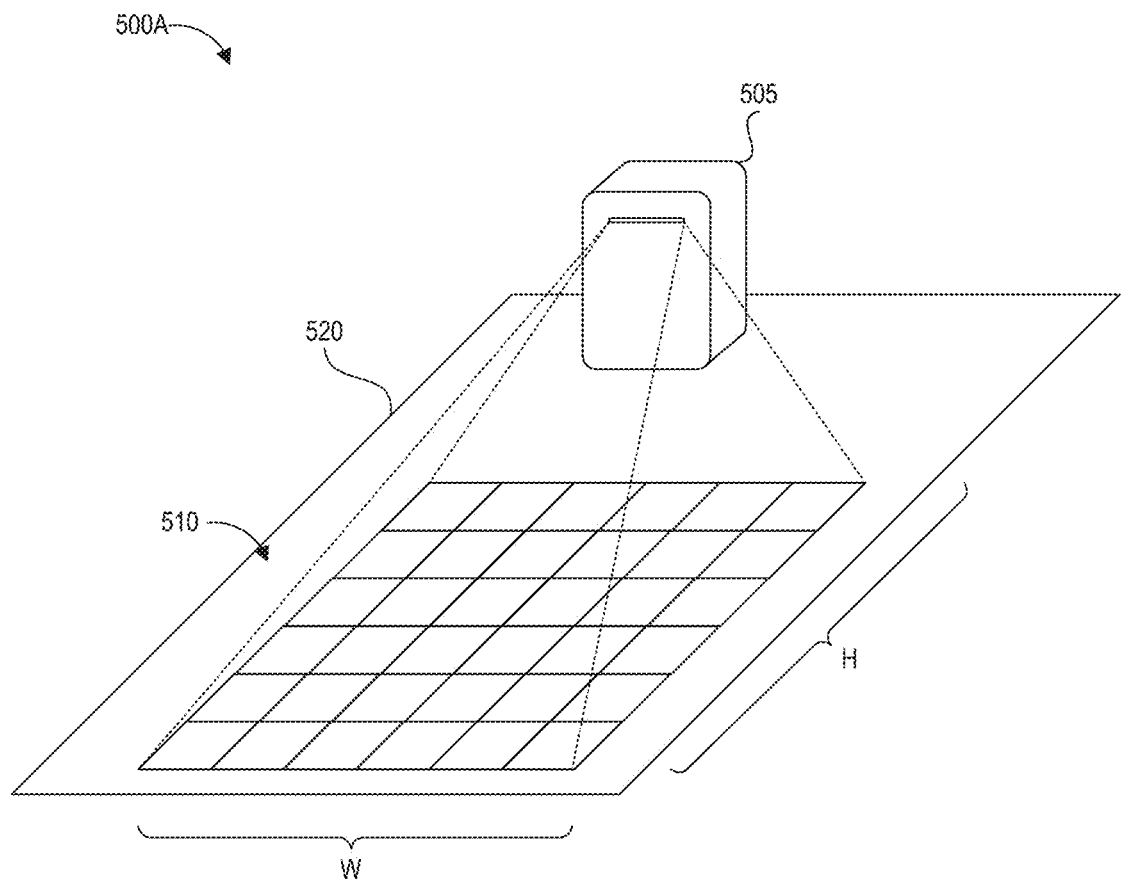
FIGS. 5A and 5B depict an example an example augmented reality projection onto a test area sampling environment as described herein.
Figure 5B:
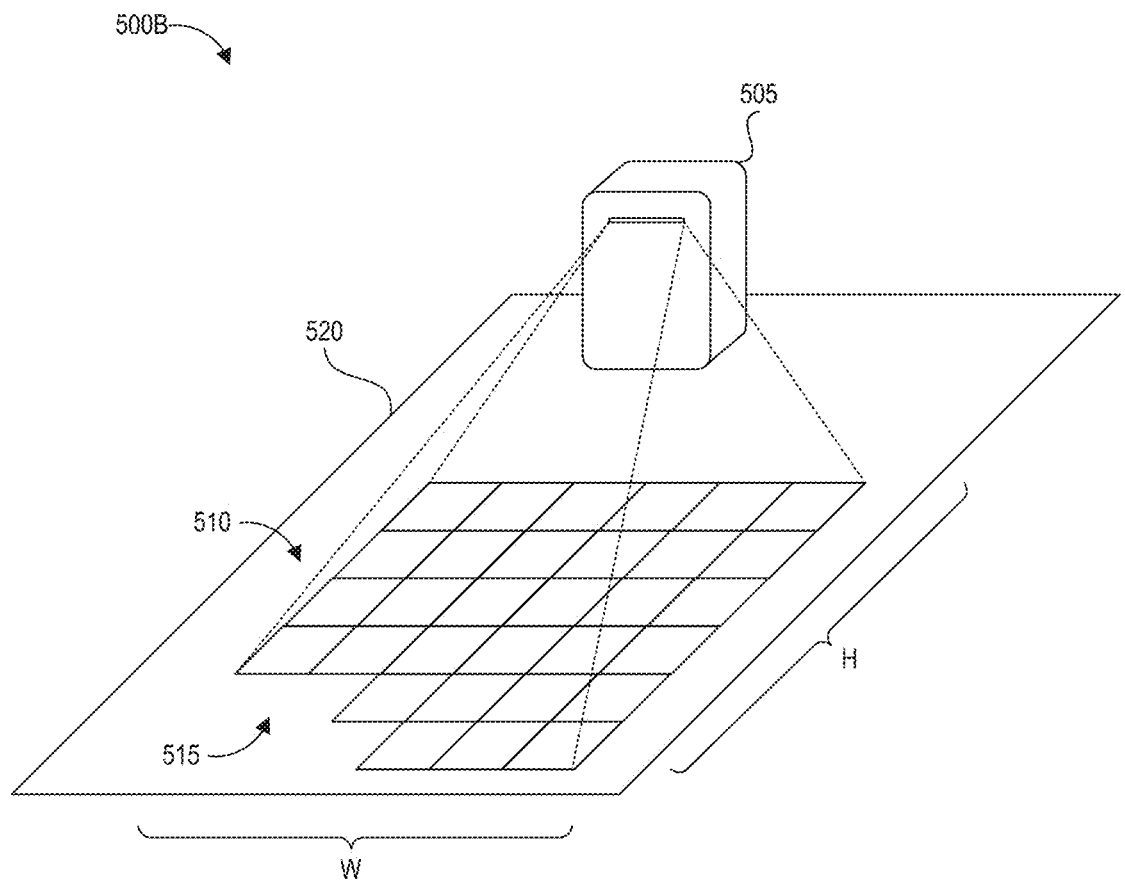

FIGS. 5A and 5B depict an example augmented reality projection onto a test area sampling environment as described herein, for example at block 115 of the process 100 described above or using process 700 described below. FIG. 5A depicts an initial configuration 500A of the augmented reality projection and FIG. 5B depicts an updated configuration 500B of the augmented reality projection of FIG. 5A partway through area sampling. The augmented reality projections of FIGS. 5A and 5B are generated by a projection device 505 positioned outside of the test area.

In the initial configuration 500A, projection device 505 projects a visual depiction of a test area 510 onto a test surface 520. For example, the projection device 505 projects a visual depiction of a test area 510 via one or more light emitting devices, such as but not limited to a laser. As shown, the test area 510 is depicted as a grid having a width W and height H. Other visual depictions are possible within the scope of this disclosure, for example rectangular (or other shaped) boundaries without a grid or an array of dots across the test area, to name a few examples.

As shown in the updated configuration 500B in FIG. 5B, the visual depiction of the test area 510 is changed to reflect that certain portions have already been swabbed. In the depicted example, the swabbed area 515 at the corner of the test area 510 is no longer is overlaid with the grid projection to represent that the user has already swabbed this portion of the test area 510. In other examples, rather than removing the overlay from the swabbed area 515 the projection device 505 can alter the visual representation of this area to use a different depiction style than used for unswabbed areas of the test area 510. Further, the device 505 can alter the projected area to include regions of the test surface 520 outside of the demarcated area 510 that have been inadvertently swabbed by the user. The different depiction style can include, for example, a different color, a different shade of the same color, a different pattern, a difference texture, or other visual difference. This change is based on a dynamic measurement performed by the device 505 as it images the test surface 520 and determines what area has been tested.

Beneficially, the device 505 mitigates the amount of contact between the user and the potentially contaminated test surface, and also provides repeatability and accuracy. For example, a technician does not have to position and adjust the device 505 to project on this exact same area each time the surface is tested. In some embodiments, the device 505 can be affixed near the test surface to provide consistency of the demarcated area and location, as distance between the device 505 and the test area 510 can alter the actual area within the projected demarcated geometry. The device 505 can be durable and can remain in use for multiple testing cycles. The consistency of the device 505 also removes risk of user error, particularly in scenarios where the same region is tested periodically, leading to strong repeatability and more reliable and accurate test results. The user may only be required to push a button to turn on the device 505 and be presented with the demarcated geometry of the test area, and when testing is completed can press the button to switch the device off (or simply leave and wait for the device to enter a standby or sleep mode). This eliminates the need to remove any physical markers (e.g., sticky dots) from the test area after testing is completed, which is a portion of current testing processes that potentially exposes the user to hazardous drugs.

Figure 6:
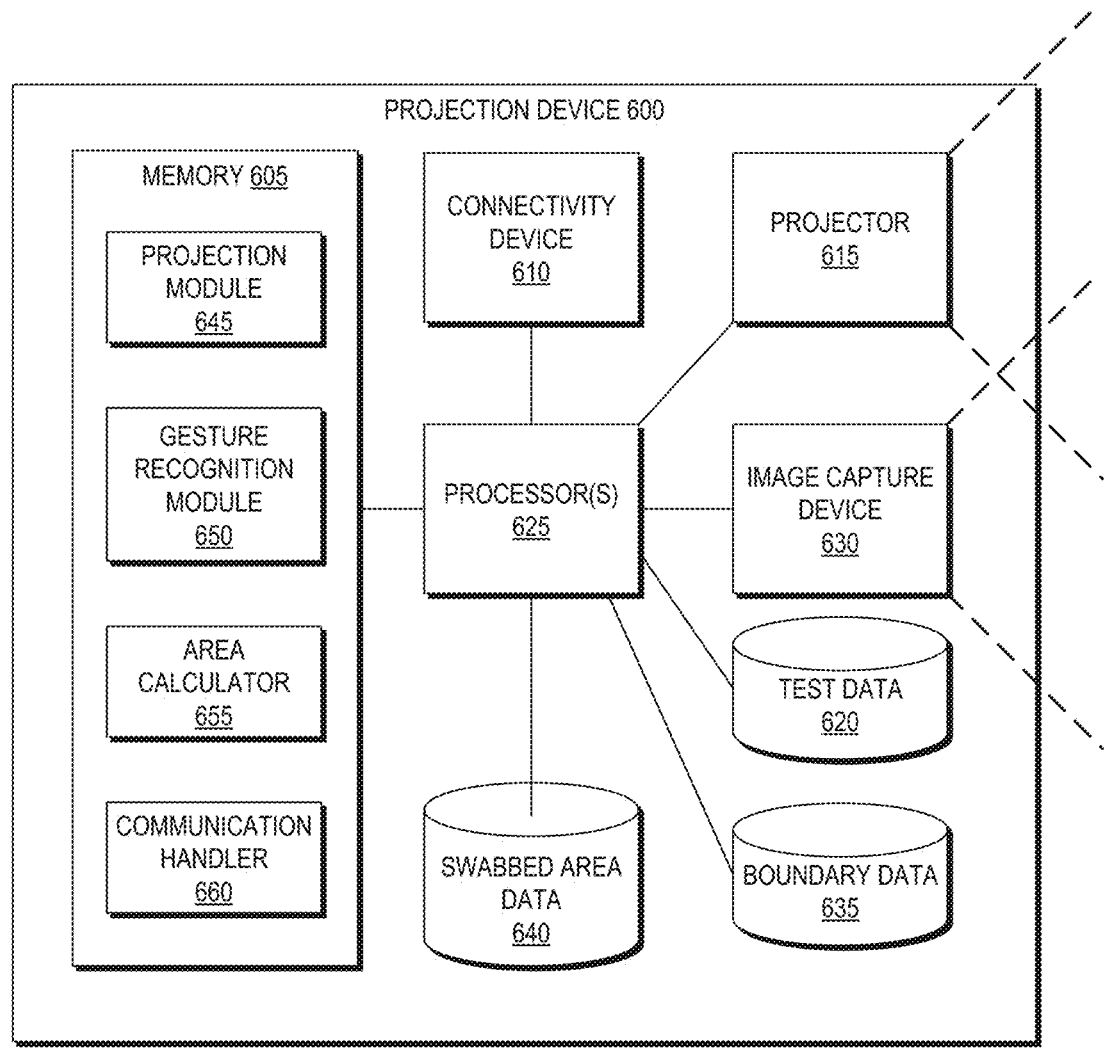
FIG. 6 depicts a high level schematic block diagram of an example projection device that can be used to generate and display the example projections of FIGS. 5A and 5B.

FIG. 6 depicts a high level schematic block diagram of an example projection device 600 that can be used to generate and display the example projections of FIGS. 5A and 5B. The device 600 can be any suitable for a projecting an image or video of a test area overlay onto a test environment. For example, device 600 can use lasers or LEDs to project images. The projection device 600 includes a number of different components for generating and projecting augmented reality views to a user, for example image capture device 630, projector 615, processor(s) 625, connectivity device 610, a working memory 605, and a number of data repositories. The data repositories include boundary data repository 635, swabbed area data repository 640, and test data repository 620. Though shown separately in FIG. 6 for purposes of clarity in the discussion below, it will be appreciated that some or all of the data repositories can be stored together in a single memory or set of memories. The working memory 605 stores a number of processing modules including projection module 645, gesture recognition module 650, area calculator 655, and communication handler 660. Each module can represent a set of computer-readable instructions, stored in a memory, and one or more processors configured by the instructions for performing the features described below together.

In some implementations, device 600 can be programmed with a specific test area boundary size. The device 600 can be placed or affixed within a test environment so that the field of projection is directed toward the desired sampling surface. The device 600 can be activated by a user before beginning contaminant sampling. In such implementations, the device 600 can illuminate the same area each time, which can be beneficial for consistently testing the same area after decontamination to assess success of the decontamination procedures, or for periodic testing to confirm the absence of contamination and/or monitor the change in contamination level of the test environment over time. Another benefit of such a device is the quick setup prior to sampling—a user can simply activate the device to illuminate a predetermined test region and begin sampling. Other embodiments of the device 600 can be configured for portability and use in a variety of sampling environments. The device 600 may enable a user to select a specific test area boundary or input test information for automatically determining the boundary. In some examples, the device 600 is permanently or removably positioned on a stationary stand on the testing surface so that it is consistently in the same location relative to and the same height from the sampling surface. In another example, the device 600 is permanently or semi-permanently affixed in a location over a benchtop, on a desk, or inside a fume hood where antineoplastic agents are handled, prepared, and/or dispensed.

Image capture device 630 is configured for acquiring images of the test environment. As described below, these images can be used to monitor user interaction with the test area. The image capture device 630 can comprise, in various embodiments, a charge-coupled device (CCD), complementary metal oxide semiconductor sensor (CMOS), or any other image sensing device that receives light and generates image data in response to the received image. In some embodiments, the image capture device 630 and corresponding functionality described below can be omitted, and device 600 can be used just for demarcation of test area boundaries and not for tracking.

The device 600 can use the projector 615 to project the visual representation of the test area onto the real-world test environment. Projector 615 can include at least one light source (e.g., a laser or LED light) and optionally one or more lens elements. For example, the projector 615 of a device 600 used to present the dynamically updating overlay as shown in FIGS. 5A and 5B may include a laser galvanometer that steers a laser into any desired pattern. The device 600 may digitally control the image projected through projector 615, may use analog components to control the image, for example transparent/colored slides, masks, or a combination thereof.

Connectivity device 610 can include electronic components for wired and/or wireless communications with other devices. For example, connectivity device 610 can include a wireless connection such as a cellular modem, satellite connection, or Wi-Fi, or via a wired connection. Thus, with connectivity device 610 the device 600 can be capable of sending or uploading data to a remote repository via a network and/or receiving data from the remote repository. As such, the data relating to test area swabbing generated by device 600 (for example test area boundary size and actual area sampled) can be provided to remote data repositories, for example in test devices used to analyze the collected samples. A module having a cellular or satellite modem provides a built-in mechanism for accessing publicly available networks, such as telephone or cellular networks, to enable direct communication by the device 600 with network elements or testing devices to enable electronic data transmission, storage, analysis and/or dissemination. In some implementations this can be performed without requiring separate intervention or action by the user of the device, for example upon detecting completion of sampling (e.g., identifying via automated image analysis that the user has inserted the swab into a container and thus completed sampling). In some embodiments connectivity device 610 can provide connection to a cloud database, for example a server-based data store. Such cloud based connectivity can enable ubiquitous connectivity of augmented reality test devices without the need for a localized network infrastructure. Further, in some examples connectivity device 610 can enable wireless transmission of software updates to the device 600 (and to similar devices within a designated environment or group of users), for example relating to updates to size and/or location of test areas within a clinical environment, updated test analysis algorithms, updated threshold concentration levels, software fixes, and the like.

Processor(s) 625 include one or more hardware processors configured to perform various processing operations on received image data for generating and projecting augmented reality overlays and tracking sampled areas, for example. Processor(s) 625 can include one or more of a dedicated image signal processor, a graphics processing unit (GPU), a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

As shown, processor(s) 625 are connected to a working memory 605 storing a number of modules. As described in more detail below, these modules include instructions that configure the processor(s) 625 to perform various image processing and device management tasks. Working memory 605 may be used by processor(s) 625 to store a working set of processor instructions contained in the modules of memory 605. Working memory 605 may also be used by processor(s) 625 to store dynamic data created during the operation of device 600. In some implementations, a design may utilize ROM or static RAM memory for the storage of processor instructions implementing the modules contained in memory 605. The processor instructions may be loaded into RAM to facilitate execution by the processor(s) 625. For example, working memory 605 may comprise RAM memory, with instructions loaded into working memory 605 before execution by the processor(s) 625.

Boundary data repository 635 is a data storage device that stores data representing size and location of a test area boundary. For example, boundary data repository 635 can store dimensions (e.g., width and length) of a test area, and can further store information regarding different regions of a test area, for example for use in adjusting the representation of swabbed areas as discussed with respect to FIG. 5B. Some implementations of the boundary data repository 635 can store a single size for a test area (e.g., one foot by one foot) and the user can position the device 600 to project the boundary in the desired location on the test surface. In some implementations, boundary data repository 635 can store a number of options regarding test area boundaries (e.g., different sizes) and these options can be made available for selection by the user at the beginning of setup for contaminant sampling. In some implementations, the device 600 can automatically select a test area boundary size for a particular sampling process, for example using information identifying one or more of the test area, a sample collection kit being used for the test area sampling, and a test device that will be used to test the sample. In some implementations, the data in the boundary data repository can be input by a user, either manually via user input controls or via a detected gesture input, for example by the user drawing a boundary over the test area with a hand.

Swabbed area data repository 640 is a data storage device that stores data representing the actual area swabbed during a hazardous contaminant sampling procedure. The swabbed area data repository 640 can be updated during the course of a sampling procedure to reflect the unit area (e.g., $cm^2$) and/or percentage test area that has been swabbed by a user. This data can be determined by the area calculator module 655 as described in more detail below.

Test data repository 620 is a data storage device that stores information relating to the sampling procedure. This data can include identifiers representing an operator performing the procedure, the location of the test area, a sampling kit or device used to collect the sample from the test area, a test device intended for use in analyzing the collected sample, and the specific antineoplastic drug or other contaminant sought to be detected by the testing, to name a few examples. The data in test data repository 620 can include parameters of the collection and/or test devices in some implementations, for example parameters relating to area sampling such as swab size. The test data repository 620 can also include information about specific personnel associated with a sampling procedure as well as contact information for such personnel.

In some implementations, the test data repository 620 can be used to store and analyze aggregate test data from a specific location, by a specific user, or using a particular type of collection/test device at a number of different points in time. The test data repository can also be used to store aggregate test data from a number of different test environments or sampling locations. Thus in some embodiments the test data repository 620 may be stored on, or mirrored to, a remote data repository, for example a repository in network communication with a network of different augmented reality devices and test devices. Beneficially, this can increase traceability of the sampling procedures performed by storing devices used for tests, areas sampled, results of sample analysis, and associated documentation regarding test operators. Though not illustrated, in some embodiments the device 600 can be configured with a test results module (similar to device 300) for reading test results from test devices, and these results can be stored in the test data repository 620.

Projection module 645 is a module configured to generate, update, and cause display of augmented reality overlays. As described herein, an overlay can include a visual representation of a test area and/or test area boundary displayed over the test surface in order to guide a user in sampling a specific area. An overlay can also include modifications to the visual representation of the test area to indicate areas that have already been swabbed (e.g., change in color, brightness, or pattern overlaying the test area). An overlay can further include various user interface elements in some implementations.

Gesture recognition module 650 is a module configured to identify gestures made by the hands and/or fingers of a user in image data received from the image capture device 630. Such gestures can include, for example, command gestures (e.g., initiate swab tracking, swabbing complete), swabbing motions (e.g., for tracking actual swabbed area), and press, select, drag, and/or swipe gestures for interacting with buttons or other augmented reality overlay user interface features. In some embodiments, the device 600 may be provided with one or more trackers that the user can wear on fingers or hands, or secure to a sampling swab handle, to facilitate gesture recognition and sampled area tracking. Such trackers can include accelerometers, gyroscopes, electromagnetic (EM) position sensors passing through an EM field generated around the test environment, and other suitable position sensors, and/or can include optical markers (e.g., specifically-colored materials or reflective materials). Position sensors can communicate with the device 600 via the connectivity device 610 in some implementations. In the case of optical markers, the gesture recognition module can include instructions to identify and track the location of such markers in data received from the image capture device 630. In some embodiments, the boundary of a sample collection swab can be provided with optical markers in order to facilitate determination by the device 600 of actual area of the test surface that passes underneath the swab material.

Area calculator 655 is a module configured to calculate the actual area swabbed during a sampling procedure. Area calculator 655 can receive one or more of the following: (i) data from the boundary area data repository 635 regarding a set size and location of the test area, (ii) data from the gesture recognition module 650 regarding movement of the swab and/or a user's hand through the test area during sample collection, and optionally (iii) data from the test data repository 620 regarding swab size. Area calculator 655 can use the received data to calculate the actual area that has been swabbed during sample collection (both within and outside of the designated test area boundary) and/or percentage of the test area that has been swabbed. In some examples, the device 600 can provide a first audio or visual signal to the user when the actual swabbed area equals a minimum (or threshold) area and can provide a second audio or visual signal (possibly different than the first) when the actual swabbed area equals an optimal swab area. The user can know after the first signal that they could stop sampling, and can know after the second signal that they must stop sampling.

Communication handler 660 is a module configured to manage communication from device 600 to external devices using the connectivity device 610. For example, communication handler 660 can be configured to transmit test data (e.g., actual sampled area and other information stored in the data repositories 635, 640, 620) to remote devices (e.g., a database of a healthcare organization, a test device used to analyze the sample) in response to commands identified by the UI command handler 355. In some embodiments, such data can be sent automatically without requiring further input from the user upon the occurrence of a specific event, for example completion of sampling. Device 600 can programmatically identify completion of sampling in a number of different ways including an explicit indication by the user (e.g., selection of a sampling completed UI element), implicit indications by the user (e.g., leaving the test environment, inserting the swab into a collection container), or a predetermined period of time after initiation of the device 600 for guidance of area sampling.

Communication handler 660 can also handle transmission of any alerts to personnel associated with a sampling procedure, for example alerts that sampling has been completed and/or that the test area was sampled according to pre-specified performance standards. In some embodiments the device 600 may determine the results of testing the collected sample and can additionally or alternatively provide alerts regarding any identified hazardous contaminant. The alerts can be provided locally within the test environment and/or externally to authorized personnel. For example, the device 600 can project a hazard indication or other visual indication of contamination onto the test area. Other alert options include emitting an audible tone (e.g. a beep) or audible warning of the contamination.

Figure 7:
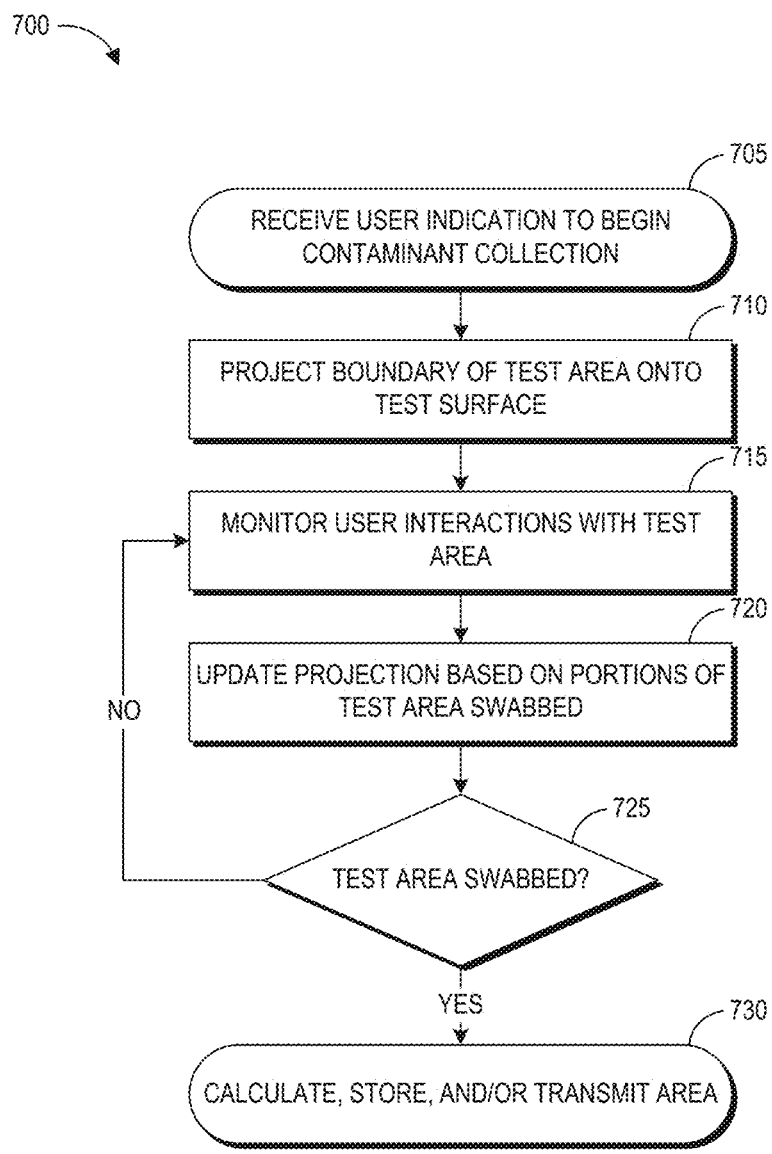
FIG. 7 illustrates an example process for implementing a projected test area sampling environment, for example the projections of FIGS. 5A and 5B.

FIG. 7 illustrates an example process 700 for implementing an augmented reality test area sampling environment, for example providing the display of FIGS. 5A and 5B using the device 600 of FIG. 6.

The process 700 begins at block 705, in which the device 700 can receive a user indication to begin contaminant sample collection. In some embodiments, this indication can include the user powering on the device 700. Other implementations can receive a start testing command through user interaction with user interface elements (projected and determined via image analysis or mechanically incorporated into device 700).

At block 710, the projection module 645 and projector 615 of device 600 can project an augmented reality overlay onto the test environment. This can include projecting an initial depiction of the unswabbed test area, for example as shown in FIG. 5A.

At block 415, the projection module 645 can add a visual representation of the test area and/or the test area boundary to the augmented reality overlay. For example, the border of the test area can be displayed as a two-dimensional rectangle or a three-dimensional box. As another example, the color and/or brightness of the test area can be changed to visually distinguish the test area from surrounding areas.

At block 715, the gesture recognition module 650 can monitor user interactions with the test area. These interactions can include the user contacting the surface within the test area with a sampling swab and moving the sampling swab across the surface. Block 715 can include monitoring a position of the swab within the test area (and optionally identifying swabbing outside of the test area) and in some implementations can further include confirming that the swab is in contact with the test surface.

At block 720, the projection module 645 and projector 615 can update the projection based on identified portions of the test area that have been swabbed, for example as shown in FIG. 5B. For example, the projection module 645 and projector 615 can determine not to display any overlay over the identified swabbed area of the test area to indicate that the user has already swabbed this portion. In other examples, rather than removing the overlay from the swabbed area the projection device can alter the visual representation of this area to use a different depiction style (e.g., color, intensity, or pattern) than used for unswabbed areas of the test area.

At decision block 725, the device 600 can determine whether the entire test area has been swabbed. If not, the process 700 loops back to block 715 to monitor user interactions with the test environment.

If the device 600 determines at block 725 that the entire test are has been swabbed, some implementations can transition automatically to block 730. Other implementations can transition to block 730 after receiving a user input that sampling is completed or by programmatically identifying completion of sampling. At block 730, the device 600 can calculate, store, and/or transmit the sampled area. For example, the area calculator 655 can generate a final calculation of the actual area sampled by the user during the process 700. This calculation can be stored in the swabbed area data 640 in association with the sampling procedure in some embodiments. In other embodiments, the communication handler 660 can cause transmission of the final calculated area and any other specified information relating to the test to a remote device, for example a test device designated for analyzing the liquid sample and/or healthcare facility database.

Implementing Systems and Terminology

Implementations disclosed herein provide systems, methods and apparatus for detection of the presence and/or quantity of hazardous drugs. One skilled in the art will recognize that these embodiments may be implemented in hardware or a combination of hardware and software and/or firmware.

The assay reading functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. The phrase "based on" can mean "based only on" and "based at least on," unless expressly specified otherwise.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the scope of the invention. Thus, the present invention is not intended to be limited to the implementations shown herein but is to be accorded the widest scope consistent with the principles and novel features disclosed herein.

What is claimed is:

1. An augmented reality system for guiding collection of hazardous contaminant samples, comprising:
   an image capture device configured for capturing images of a sampling environment including a test surface;
   a display configured to display an augmented reality overlay over a view of the sampling environment, the augmented reality overlay including a visual representation of a boundary of a test area;
   at least one computer-readable memory having stored thereon executable instructions; and
   one or more processors in communication with the at least one computer-readable memory and configured to execute the instructions to cause the system to:
   cause output via the display of the visual representation of the boundary of the test area,
   track movement of the swab as a user swabs at least a portion of the test area to collect the sample, determine a size of an actual area swabbed by the user based at least in part on the tracked movement, and transmit an indication of the size of the actual area swabbed.

2. The system of claim 1, wherein the one or more processors are configured to execute the instructions to cause the system to analyze data from the image capture device to track movement of the swab.

3. The system of claim 1, wherein the one or more processors are configured to execute the instructions to cause the system to transmit the indication of the size of the actual area swabbed to a test device identified for analysis of the sample.

4. The system of claim 1, wherein the one or more processors are configured to execute the instructions to cause the system to receive an indication of a level of contamination of the test surface and output an alert to the user indicating the presence of contamination.

5. The system of claim 1, wherein the one or more processors are configured to execute the instructions to cause the system to receive an indication of a level of contamination of the test surface and output an alert to the user indicating the level of contamination.

6. The system of claim 1, wherein the one or more processors are configured to execute the instructions to cause the system to maintain, in the augmented reality overlay, the location of the test area relative to one or both of the system and the sampling environment as the user moves around the sampling environment.

7. The system of claim 1, wherein the one or more processors are configured to execute the instructions to cause the system to:
compare the actual area swabbed by the user to a predetermined threshold swabbed area, and
in response to determining that the actual area swabbed is equal to the predetermined desired swabbed area, provide an indication to the user to terminate swabbing the test area.

8. The system of claim 1, wherein the sample is a liquid sample.

9. The system of claim 1, wherein the one or more processors are configured to execute the instructions to cause the system to:
receive data from the image capture device representing a test device after provision of the sample to the test device, and
analyze the received data to identify the presence of a hazardous contaminant and/or a level of contamination of a hazardous contaminant on the test surface.

10. An augmented reality system for guiding collection of hazardous contaminant samples, comprising:
an image capture device configured for capturing images of a sampling environment including a test surface;
a display configured to display an augmented reality overlay over a view of the sampling environment, the augmented reality overlay including a visual representation of a boundary of a test area;
at least one computer-readable memory having stored thereon executable instructions; and
one or more processors in communication with the at least one computer-readable memory and configured to execute the instructions to cause the system to:
cause output via the display of the visual representation of the boundary of the test area,
capture, using the image capture device, one or more images of the sampling environment;
track movement of the swab as the user swabs at least a portion of the test area to collect the sample,
identify, based on the tracked movement of the swab, swabbed pixels of the one or more images corresponding to portions of the test area actually swabbed by the user, and
transmit a notification based at least in part on the swabbed pixels.

11. The system of claim 10, wherein the one or more processors are configured to execute the instructions to cause the system to modify presentation of the test area in the augmented reality overlay to show the portions of the test area actually swabbed by the user using a first visual depiction and to show unswabbed portions of the test area using a second visual depiction different than the first visual depiction.

12. The system of claim 10, wherein the one or more processors are configured to execute the instructions to cause the system to display a trail over the portions of the test area actually swabbed by the user.

13. The system of claim 10, wherein the one or more processors are configured to execute the instructions to cause the system to analyze data from the image capture device to track movement of the swab.

14. The system of claim 10, wherein the one or more processors are configured to execute the instructions to determine, based at least in part on the tracked movement, an area size of the portions of the test area actually swabbed by the user.

15. The system of claim 14, wherein the notification comprises an indication of the size of the actual area swabbed to a test device identified for analysis of the sample.

16. The system of claim 10, wherein the notification comprises an indication to the user that an area greater than or equal to a predetermined threshold area has been swabbed.

17. The system of claim 10, wherein the notification comprises an indication to the user that areas outside of the test area have been swabbed to often or too much.

18. The system of claim 10, wherein the one or more processors are configured to execute the instructions to cause the system to receive an indication of a level of contamination of the test surface and output an alert to the user indicating the presence of contamination.

19. The system of claim 10, wherein the one or more processors are configured to execute the instructions to cause the system to receive an indication of a level of contamination of the test surface and output an alert to the user indicating the level of contamination.

20. The system of claim 10, wherein the one or more processors are configured to execute the instructions to cause the system to:
compare the actual area swabbed by the user to a predetermined threshold swabbed area, and
in response to determining that the actual area swabbed is equal to the predetermined desired swabbed area, provide an indication to the user to terminate swabbing the test area.

* * * * *